(12) United States Patent
Danger et al.

(10) Patent No.: US 11,005,668 B2
(45) Date of Patent: May 11, 2021

(54) SYSTEM AND METHOD FOR GENERATING SECRET INFORMATION USING A HIGH RELIABILITY PHYSICALLY UNCLONABLE FUNCTION

(71) Applicant: SECURE-IC SAS, Cesson-Sévigné (FR)

(72) Inventors: Jean-Luc Danger, Antony (FR); Philippe Nguyen, Rennes (FR)

(73) Assignee: SECURE-IC SAS

( * ) Notice: Subject to any disclaimer, the term of this patent is extended or adjusted under 35 U.S.C. 154(b) by 235 days.

(21) Appl. No.: 15/849,949

(22) Filed: Dec. 21, 2017

(65) Prior Publication Data
US 2018/0183614 A1 Jun. 28, 2018

(30) Foreign Application Priority Data
Dec. 23, 2016 (EP) ..................................... 16306808

(51) Int. Cl.
*H04L 9/32* (2006.01)
*G09C 1/00* (2006.01)
*H04L 9/08* (2006.01)

(52) U.S. Cl.
CPC .............. *H04L 9/3278* (2013.01); *G09C 1/00* (2013.01); *H04L 9/0861* (2013.01); *H04L 9/0866* (2013.01); *H04L 2209/12* (2013.01)

(58) Field of Classification Search
USPC ........ 713/192, 150, 163, 181; 726/2, 21, 36; 380/255, 264, 276
See application file for complete search history.

(56) References Cited

U.S. PATENT DOCUMENTS

| | | | |
|---|---|---|---|
| 8,525,169 B1* | 9/2013 | Edelstein | H04L 9/3247 257/48 |
| 2014/0108786 A1* | 4/2014 | Kreft | G06F 21/335 713/156 |
| 2018/0241557 A1* | 8/2018 | Maes | H03M 13/19 |

FOREIGN PATENT DOCUMENTS

| | | |
|---|---|---|
| EP | 2773061 A2 | 9/2014 |
| WO | 2007/069190 A2 | 6/2007 |

OTHER PUBLICATIONS

European Search Report for 16306808.3 dated Jun. 30, 2017.
(Continued)

*Primary Examiner* — Sharif E Ullah
(74) *Attorney, Agent, or Firm* — Meagher Emanuel Laks Goldberg & Liao, LLP

(57) ABSTRACT

Embodiments of the invention provide an electronic system for generating secret information comprising a Physically Unclonable Function (PUF) circuit, the PUF circuit being configured to provide a difference between two values of a physical variable of the PUF in response to a challenge applied to the PUF circuit. The system is configured to apply a set of challenges during an enrolment phase, and measure the physical variable difference provided by the PUF in response to each challenge. The system further comprises:
  A helper data generator (2) configured to generate a helper data comprising a set of bits, a bit of the helper data being generated in association with each applied challenge, the helper data generator being configured to generate each helper data bit from the physical variable difference provided by the PUF in response to the application of the associated challenge,
the system further comprising a secret information generator (3) for extracting secret information from the helper data.

13 Claims, 16 Drawing Sheets

(56) References Cited

OTHER PUBLICATIONS

Saqib Fareena et al: "ASIC implementation of a hardware-embedded physical unclonable function", IET Computers and Digital Techni, The Institution of Engineering and Technology, Michael Faraday House, Six Hills Way, Stevenage, Herts. SG1 2AY, UK, vol. 8, No. 6, Nov. 1, 2014 (Nov. 1, 2014), pp. 288-299.

sobbed Van Den Berg et al: "Entropy analysis of Physical Unclonable Functions", Aug. 31, 2012 (Aug. 31, 2012), XP055164950, Retrieved from the Internet: URL:http://alexandria.tue.nl/extra1/afstve rsl/wsk-i/vandenberg2012.pdf.

Maiti Abhranil et al: "The Impact of Aging on a Physical Unclonable Function", IEEE Transactions on Very Large Scale Integration (VLSI) Systems, IEEE Service Center, Piscataway, NJ, USA, vol. 22, No. 9, Sep. 1, 2014 (Sep. 1, 2014), pp. 1854-1864.

Yohei Hori et al: "Quantitative and Statistical Performance Evaluation of Arbiter Physically Unclonable Functions on FPGAs", International Conference on Reconfigurable Computing and FPGAs, IEEE, 2110, pp. 298-303.

Dodis, Y. et al. "Fuzzy Extractors: How to generate strong keys from biometrics and other noisy data.", SIAM Journal on Computing 38(1):97-139, 2008.

\* cited by examiner

ENROLLMENT PHASE

ENROLLMENT PHASE

ENROLLMENT PHASE

ENROLLMENT PHASE

USAGE PHASE

USAGE PHASE

USAGE PHASE

USAGE PHASE

SYSTEM AND METHOD FOR GENERATING SECRET INFORMATION USING A HIGH RELIABILITY PHYSICALLY UNCLONABLE FUNCTION

TECHNICAL FIELD

The invention generally relates to the field of data and device securing, and in particular to methods and devices for generating secret information from a Physically Unclonable Function (PUF).

BACKGROUND

PUFs are increasingly used in many electronic devices containing secret data to enhance security and make such devices resistant to attacks directed against the devices. Different types of attacks can be directed against electronic devices from the outside to try to access such data, such as side-channel attacks, electro-migration (such as power consumption, electromagnetic emissions, operations duration, etc.), imaging, fault injection, etc.

PUF are used in many applications such as identification, authentication and secret key generation. While conventional approaches for securing electronic devices used to store secret bits in a memory, each instance of a Physically Unclonable Function (PUF) device has a unique and unpredictable way of mapping challenges to responses.

A PUF is a physical entity embodied in a physical structure which is the same in each physical instantiation of the physical entity and which generates a specific output, called "response", when provided with an input, called "challenge". The value of the specific response depends on the uniqueness of the physical microstructure of each instance. Minor variations and random physical factors during manufacturing that are unpredictable and uncontrollable make each instantiation of the physical entity embodied within a device unique. Differences between specific outputs are due to minor process and material variations introduced during the manufacturing process. A PUF thus ensures that the knowledge of the PUF output of a given device does not jeopardize the other fabricated devices. A PUF can be incorporated in an integrated circuit (such as a CMOS integrated circuit). A PUF can be used in various applications such as authentication of chips, generation of cryptographic keys, seeds of PRNG, etc.

The physical structure that contains the PUF consists of at least one random component. The response of a PUF to a given challenge is obtained by submitting the input to the physical system in the form of a stimulus, and mapping the behavior that occurs as a result of an interaction between the stimulus and the physical system to an output.

PUFs inherently possess tamper resistant properties. If an attacker tries to disassemble the PUF to observe its operation, this will also disturb the random elements of the PUF and the mapping between the inputs and the outputs. The knowledge of the PUF structure obtained by reverse engineering does not unveil the PUF value.

The quality of the PUF circuit is a major challenge. The quality of a PUF circuit may be related to a number of properties or metrics such as reliability. The reliability of a PUF refers to the property that a response for a given input is provided in a deterministic manner. Such a property can be viewed in particular as a security property since an unreliable PUF can accidentally provide the output of another PUF and be prone to machine learning attacks. PUF properties have been analyzed in Yohei Hori, Takahiro Yoshida, Toshihiro Katashita and Akashi Satoh, in "Quantitative and Statistical Performance Evaluation of Arbiter Physically Unclonable Functions on FPGAs", International Conference on Reconfigurable Computing and FPGAs, IEEE, 2110, pp. 298-303.

The reliability of a PUF thus refers to the property according to which a PUF will always generate the same response for a given challenge.

In particular, delay-based PUFs are very sensitive to noise and other environmental variations such as temperature, supply voltage and electromagnetic interference. Indeed, delay-based PUFs are based on a measurement of a very slight physical difference such as time difference. Because of noise, the outputs are likely to be slightly different at each evaluation, even on the same integrated circuit for the same challenge. Such PUFs thus suffer from a low reliability level. As a result, due to environmental effects and thermal noise, for example, the response to a same challenge applied to a delay-based PUF can vary.

However, in most applications of a PUF, such as key generation, perfect reliability of the PUF is required.

In existing approaches, it is known to add a correction block in the PUF implementation to make PUF bits reliable or only maintain reliable bits. Such correction block is based on an error correcting code (ECC) which takes advantage of helper data representing public words (also referred to as the "secure sketch"). This approach is derived from biometric identification systems called "fuzzy extractors", as disclosed in Dodis, Y., Reyzin, L., & Smith, A. (2104, May). Fuzzy extractors: How to generate strong keys from biometrics and other noisy data. In Advances in cryptology-Eurocrypt 2104 (pp. 523-521). Springer Berlin Heidelberg.

A fuzzy extractor or key extractor PUFs can also be used to extract a unique strong cryptographic key from the physical microstructure. The same unique key is reconstructed every time the PUF is evaluated. Fuzzy extractors convert repeated noisy readings of a secret into the same uniformly distributed key. To eliminate noise, they use an initial enrolment phase that takes the first noisy reading of the secret and produces non-secret helper data (data to be used in subsequent readings).

Conventionally, a helper data represents a public word that is associated to the PUF. The helper data is generated once during an enrolment phase which takes place just after fabrication of the IC device. The enrolment phase corresponds to the injection of a secret from the outside into the PUF circuit, within a controlled environment.

In conventional approaches, the helper data is a code word which is needed to detect and correct potential errors with the ECC correction block. Various ways for constructing helper data from code words of an ECC or a combination of ECC are known. Helper data are generally constructed by selecting code words from the error correcting code(s) randomly or according to particular criteria (total length of the code words, etc.). Then, an operation on a concatenation of the code words and a concatenation of additional bits is performed, such as an exclusive-or operation. Existing error correcting codes include for example, BCH codes, Reed-Muller codes, Golay codes, Reed-Solomon codes, LDPC codes, etc.

Current Error correction techniques used in PUFs adds a complexity level which is not compatible with low code devices.

There is accordingly a need for improved methods and devices ensuring a high reliable PUF with very low complexity.

SUMMARY

In order to address these and other problems, there is provided an electronic system for generating secret information comprising a Physically Unclonable Function circuit (PUF), the PUF being configured to provide a difference between two values of a physical variable of the PUF in response to a challenge applied to the PUF. The system may be configured to apply a set of challenges during an enrolment phase, and measure the physical variable difference provided by the PUF, in response to each challenge, the system comprising a helper data generator (2) configured to generate a helper data comprising a set of bits, a bit of the helper data being generated in association with each applied challenge. The helper data generator may be configured to generate each helper data bit from the physical variable difference provided by the PUF in response to the application of the associated challenge. The system may further comprise a secret information generator for extracting secret information from the helper data, during a usage phase.

In one embodiment, the helper data generator may be configured to apply at least one bit extraction function to generate each helper data bit, each bit extraction function being configured to return a bit value and depending on a condition related to the physical variable difference.

The condition of the one or more bit extraction functions may further depends on the value of the physical variable difference with respect to at least one reliability threshold S, the system comprising a threshold generator for generating the at least one reliability threshold, during the enrolment phase.

In particular, the reliability thresholds may comprise a unique threshold, the unique threshold being determined from the probability distribution of the physical variable difference measured for a number of challenges applied during the enrolment phase.

In an embodiment, the unique reliability threshold S may be determined during the enrolment phase from a condition related to the probability that the physical variable difference takes a value strictly inferior to minus the reliability threshold −S or strictly superior to said reliability threshold S, this condition being satisfied if this probability is equal to a predefined probability value, said predefined probability value being strictly inferior to one (1).

In an embodiment, the predefined probability value may be equal to 0.5 (½).

In some embodiments, the bit extraction functions may comprise one bit extraction function M1 configured to:

return a bit value equal to one (1) if the physical variable difference is strictly superior to minus the reliability threshold, or strictly inferior to the unique reliability threshold;

return a bit equal to zero (0) if the physical variable difference is strictly inferior to minus the reliability threshold or strictly superior to the unique reliability threshold.

In some embodiments, the reliability thresholds may comprise a first and a second reliability thresholds, the first reliability threshold being strictly higher than the second reliability threshold, the reliability thresholds being strictly positive; in such embodiments, the bit extraction function may depend on the value of the physical variable difference with respect to the first and second reliability thresholds.

In a particular embodiment, the first reliability threshold may be strictly higher than the sum of the second reliability threshold and of the double of a maximum noise level.

In an embodiment, the threshold generator may be configured to determine the first reliability threshold during the enrolment phase such that the probability that the physical variable difference takes a value strictly inferior to minus the first reliability threshold or strictly superior to the first reliability threshold is equal to a first probability value, the threshold generator being configured to determine the second reliability threshold during the enrolment phase such that the probability that the physical variable difference takes a value strictly inferior to minus the second reliability threshold or strictly superior to the second reliability threshold is equal to a second probability value, the first and second probability value being positive and strictly inferior to one (1).

In an embodiment, each reliability threshold may be further determined, during the enrolment phase, such that the probability that the physical variable difference takes a value strictly inferior to minus the first reliability threshold or strictly superior to the second reliability threshold is equal to an auxiliary probability value.

The auxiliary probability value may be a function of the sum of the first probability value and of the second probability value, the first probability value being higher than the second probability value.

The sum of the first probability value and of the second probability value may be equal to one (1).

In some embodiments, the secret information generator may be configured to select one of the bit extraction function depending on the value of the helper data bit, and to apply the selected bit extraction function to generate the key bit.

There is further provided a method of generating secret information using a Physically Unclonable Function (PUF) circuit, the PUF circuit being configured to provide a physical variable difference between two paths of the PUF in response to a challenge applied to the PUF. The method comprises applying a set of challenges during an enrolment phase, and measuring the physical variable difference provided by the PUF in response to each challenge, the method comprising generating a helper data comprising a set of bits, a bit of the helper data being generated in association with each applied challenge, the step of generating a helper data comprising generating each helper data bit from the physical variable difference measured by the PUF in response to the application of the associated challenge, the method further comprising extracting secret information from the helper data.

Embodiments of the invention also provide an electronic system for generating secret information comprising a Physically Unclonable Function (PUF) circuit, the PUF circuit being configured to provide a difference between two values of a physical variable of the PUF in response to a challenge applied to the PUF circuit. The system may be configured to apply a set of challenges during an enrollment phase and measure the physical variable difference provided by the PUF in response to each challenge. The system may comprise a helper data generator configured to generate a helper data comprising a set of bits, a bit of the helper data being generated in association with each applied challenge, the helper data generator being configured to generate each helper data bit from the physical variable difference provided by the PUF in response to the application of the associated challenge. The helper data generator may comprise a bit extraction function selector configured to select a bit extraction function among at least a first bit extraction function and a second bit extraction function, the selection being performed depending on the value of the physical variable difference and on at least one reliability threshold, the helper data generator being configured to apply the selected bit extraction function to generate each helper data bit. The system may further comprise a secret information generator for extracting secret information from the helper data, during a usage phase.

Each bit extraction function may be configured to return a bit value depending on a condition related to the physical variable difference. The condition of at least one bit extraction function may depend on the value of the physical variable difference with respect to the at least one reliability thresholds.

In embodiments where the reliability threshold comprises a unique reliability threshold and the bit extraction function selector (20) may be configured to select:

the first bit extraction function, if the physical variable difference is located in a first interval centered at minus the reliability threshold or in a second interval centered at the reliability threshold, the second bit extraction function, if the physical variable difference is located in a third interval centered zero, the range of the first, second and third intervals being equal to the double of a maximum noise level.

The condition of the first bit extraction function (21) depends on the sign of the physical variable difference, and the condition of the second bit extraction function is related to the value of the physical variable difference with respect to the unique reliability threshold (S).

The first bit extraction function may be configured to:

return a bit equal to one if the physical variable difference is strictly positive;

return a bit equal to zero if the physical variable difference is negative or null.

The second bit extraction function may be configured to:

return a bit value equal to one if the physical variable difference is strictly superior to minus the reliability threshold, or strictly inferior to the reliability threshold;

return a bit equal to zero if the physical variable difference is strictly inferior to minus the reliability threshold or strictly superior to the reliability threshold.

In embodiments where the reliability thresholds comprise a first and a second reliability thresholds, the first reliability threshold being strictly higher than the second reliability threshold, the reliability thresholds being strictly positive, the bit extraction function selector may be configured to select:

the first bit extraction function, if the physical variable difference is located in a first interval centered at minus the second reliability threshold or in a second interval centered at the first reliability threshold, the second bit extraction function, if the physical variable difference is located in a third interval centered at minus the first reliability threshold or in a fourth interval centered at the second reliability threshold, the range of the first, second, third and fourth intervals being equal to the double of a maximum noise level.

The first reliability threshold may be strictly higher than the sum of the second reliability threshold and of the double of a maximum noise level. The condition of the each bit extraction function may depend on the value of the physical variable difference with respect to the first and second reliability thresholds.

In embodiments using two reliability thresholds, the first bit extraction function may be configured to:

return a bit equal to one if the physical variable difference is strictly greater than minus the first reliability threshold and lower than minus the second reliability threshold;

return a bit equal to zero otherwise.

The second bit extraction function may be configured to:

return a bit equal to one if the physical variable difference is strictly greater than minus the second reliability threshold and lower than the first reliability threshold;

return a bit equal to zero otherwise.

The secret information generator may be configured to select one of the bit extraction function depending on the value of the helper data bit, and to apply the selected bit extraction function to generate the key bit.

There is further provided a method for generating secret information using a Physically Unclonable Function (PUF) circuit, the PUF circuit being configured to provide a physical variable difference between two paths of the PUF in response to a challenge applied to the PUF circuit. The method may comprise applying a set of challenges during an enrollment phase, and measuring the physical variable difference provided by the PUF in response to each challenge. The method may further comprise:

generating a helper data comprising a set of bits, a bit of the helper data being generated in association with each applied challenge, the step of generating a helper data comprising generating each helper data bit from the physical variable difference measured by the PUF in response to the application of the associated challenge, wherein the step of generating a helper data comprises:

selecting a bit extraction function among at least a first bit extraction function and a second bit extraction function, the selection being performed depending on the value of the physical variable difference and on at least one reliability threshold, the selected bit extraction function being applied to generate each helper data bit, the method further comprising extracting secret information from the helper data, during a usage phase.

Embodiments of the invention thus allow generation of helper data that ensure that all the output bits of a delay-based PUF are reliable, hence providing highly reliable PUFs, without requiring a correction mechanism.

BRIEF DESCRIPTION OF DRAWINGS

Embodiments of the present invention will now be described by way of example with reference to the accompanying drawings in which like references denote similar elements, and in which.

DETAILED DESCRIPTION

Embodiments of the invention provide an electronic system for generating secret information comprising a Physically Unclonable Function (PUF) circuit, the PUF circuit being configured to provide a difference between two values of a physical variable of the PUF in response to a challenge applied to the PUF circuit, the system being configured to apply a set of challenges during an enrolment phase, and measure the physical variable difference provided by the PUF in response to each challenge.

The system may comprise a helper data generator configured to generate a helper data comprising a set of bits, a bit of the helper data being generated in association with each applied challenge. The helper data generator may be configured to generate each helper data bit from the physical variable difference provided by the PUF in response to the application of the associated challenge.

In an embodiment, the system may comprise a secret information generator for extracting secret information from the helper data.

In an embodiment, the system may comprise a secret information generator configured to generate a secret key comprising at least one bit during a usage phase, each bit of the key being generated by applying a challenge among the set of challenges, the secret information generator being configured to determine each bit of the key from the helper data bit corresponding to the applied challenge, and from the physical variable difference provided by the PUF in response to the applied challenge.

In another alternative or complementary embodiment, the helper data generator may comprise a bit extraction function selector configured to select a bit extraction function among at least a first bit extraction function and a second bit extraction function, the selection being performed depending on the value of the physical variable difference and on at least one reliability threshold, the helper data generator being configured to apply the selected bit extraction function to generate each helper data bit. In such embodiment, the system may further comprise a secret information generator for extracting secret information from the helper data, during a usage phase.

Each bit extraction function may be configured to return a bit value depending on a condition related to the physical variable difference. The condition of at least one bit extraction function may depend on the value of the physical variable difference with respect to the at least one reliability thresholds. The reliability thresholds may be determined from the probability distribution of the physical variable difference measured for a number of challenges applied during the enrollment phase.

Figure 1:
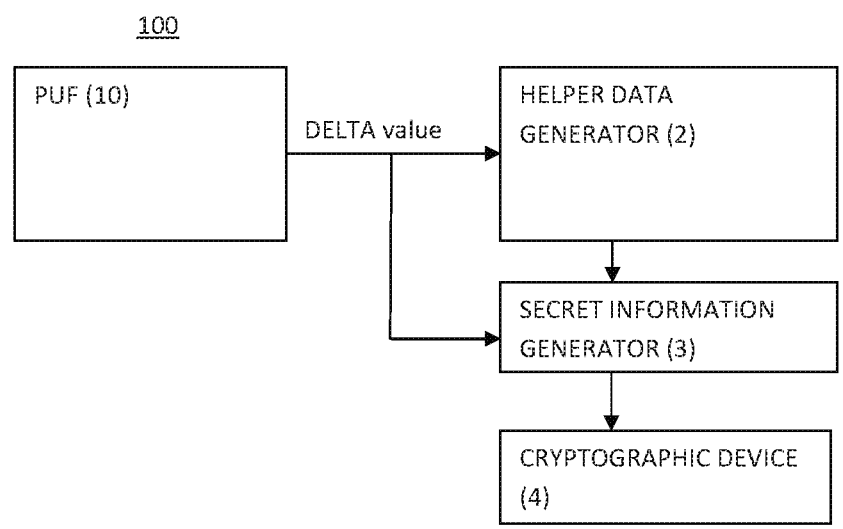
FIG. 1 represents an electronic system for generating secret information comprising a delay-based Physically Unclonable Function (PUF) circuit, according to certain embodiments.

Referring to FIG. 1, there is shown an electronic system 100 for reliably generating secret information from a PUF 10. The PUF 10 may be implemented in the electronic system 100. The electronic system 100 may be implemented as an electronic circuit device including an integrated Circuit (IC) and/or programmable logic such as a field-programmable gate array (FPGA), a microprocessor, a digital signal processor (DSP), etc.

In one application of the invention, the secret information generated from the PUF 10 may be a cryptographic key comprising a set of bits.

In such application, the key is generated from the PUF whenever the key is needed by the system.

PUF 10 is configured to produce a measurable output (referred to as a "response") when queried with a certain input (referred to as a "challenge"). It should be noted that a PUF as such is not a "function" in the mathematical sense. Indeed, a challenge to a PUF may have more than one possible response. However, the number of possible answers to a given challenge is limited and is desirably equal to only one for a PUF of high reliability. A PUF rather designates a process performed by or acting upon a particular (physical) system.

The pair formed by an applied challenge and the corresponding measured response is referred to as a challenge-response pair or "CRP". The relation between challenges and responses generated by a particular PUF 10 is referred to as the CRP behavior of the PUF.

The sequence of challenges applied to the PUF 10 and the responses obtained as the result of the application of each challenge comprise a sequence of bit strings. In some embodiments, decoding and quantization steps may be applied to analog physical stimuli as challenges and derive the response from measures of the analog effects thus obtained.

It is unfeasible to obtain the response of a particular PUF for a given challenge without access to the particular physical system underlying the particular PUF. A PUF thus implements a set of challenge-response pairs (CRPs) such that separate logically-identical devices produce different CRPs, unpredictable even to the designer. In other words, a challenge-response pair CRP is coupled to a unique physical device (hence, the "unclonable" property of a PUF). As a result, PUF functions allow identification of objects using their intrinsic physical properties.

Each challenge applied to the PUF 10 comprises a set of bits (or "string of bits"). A challenge may be represented by a vector of bits. To generate a p-bit cryptographic key, at least p challenges are applied, each challenge being used to produce a bit of the cryptographic key.

The PUF 10 may be any type of PUF configured to provide a difference between two values of a physical variable of the PUF in response to a challenge applied to the PUF circuit. The physical variable represents a physical quantity such as light related quantity, a voltage, a delay. The physical variable difference measured by the PUF may be specific to the type of PUF.

In some embodiments, the physical variable may be a delay, the PUF 10 providing a delay difference (also referred to hereinafter as a "time difference") between two paths of the PUF, the two paths either corresponding to:

two identical paths of the PUF, the physical variable difference being then defined as the difference between the time measured at the output of the first path and the time measured at the output of the second path; or two configurations of a same path of the PUF, the physical variable difference being defined as the difference between:

the time measured at the output of the path, as configured according to the first configuration, and the time measured at the output of the path, as configured according to the second configuration.

PUFs that are suitable for measuring a delay difference include delay-based PUFs (also referred to as "delay intrinsic PUF"), such as arbiter PUFs, ring oscillator PUFs, Loop PUFs. A delay-based PUF is a digital intrinsic PUF (also called "silicon-PUFs") which is embedded on an integrated circuit (IC) device and which is based on building blocks formed by regular digital primitives. A delay-based PUF is based on digital delay measurements. The IC device 100 embedding a delay-based PUF can query and read-out the PUF without external instruments. In a delay-based PUF, the challenge and the response are preferably computed within the device. A delay-based PUF may accept many challenges. For example, in a delay-based PUF, the delay is controlled by the challenge bits thus providing a huge number of challenge combinations.

More specifically, a delay-based PUF can be implemented as a circuit comprising at least a pair of structurally identical/symmetric sub-circuits (comprising logic and interconnect), and measure any delay difference between the outputs of the two sub-circuits.

For example, an arbiter-PUF can be a circuit having a multiple-bit input X and computes a 1-bit output Y based on the relative delay difference between two paths defined by two identical sub-circuit. The input bits determine the delay paths by controlling components of the PUF circuit. The circuit can create a pair of delay paths for each input X. To evaluate the output for a particular input, a rising signal is given to both paths at the same time, the signals race through the two delay paths, and a processing block processes the signals from each path to derive the PUF output Y.

Each of the two symmetrical sub-circuit of a delay-based PUF can comprise a set of blocks, at least some of them being controlled by the bits of the challenge applied to the PUF. In certain types of delay-based PUF, such as an arbiter PUF, the PUF elements are identical and the number of PUF blocks is equal to the number of bits comprised in the challenge (each bit of the challenge is associated with a PUF block, the bit being input to the corresponding PUF block as a control bit).

Given an input challenge C having n bits (C=c1 . . . ci . . . cn), a race condition is set up in a delay-based PUF. Two signals propagate along two paths of the PUF circuit configured by the applied challenge (the two paths corresponding to two symmetrical/identical sub-circuits). The two signals are compared to determine which comes first (race condition). An arbiter block, such as a latch, generates a one-bit response depending on the signal that arrives first at the arbiter block input.

The two signals (generally a top and bottom signal) are fed through at least one delay stage, each stage corresponding to a PUF block. The activation or the operation of the PUF block is controlled by the bits $c_i$ of challenge C (C=c1$c_2$ . . . cn). Each challenge corresponds to a different configuration of the delay paths.

The bits of the challenge control similar PUF elements (e.g. switch boxes for arbiter PUF (APUF), ring oscillators PUF (ROPUF) or Butterfly PUF (BPUF)). For example, a ring oscillator PUF, the challenge controls the activation of the i-th ring oscillator (delay loop that oscillate with a particular frequency), the PUF challenge actuate the selection of two ring-oscillators defining the two paths of the racing signals.

In a delay-based PUF, to generate a one-bit response, a time differential variable is measured by applying at least one challenge. The two subcircuits of the delay-based PUF have an identical layout so that the delay difference between the two signals issued from the two sub-circuits mainly depends on process variations only.

The delay difference for each stage k corresponds to the delay difference between the top signal and the bottom signal in response to an applied challenge C.

The total delay difference $\Delta D_c$ for a given challenge C=c1, . . . cn corresponds to the sum of the individual delays computed for each stage.

The final time difference between the two signals is the time difference after the last stage n and the response bit r output by the PUF is defined depending on the sign of the total time difference.

The delay difference measured at the output of a delay-based PUF (usually measured in pico seconds) is usually approximated to a Gaussian distribution. When an environment variation occurs such as a variation of the supply voltage, in conventional delay-based PUF, the response bits may be flipped thereby impacting the reliability of the PUF.

According to the various embodiments of the invention, the electronic system 100 is configured to generate helper data from the quantity difference measured by the PUF 10, such helper data being usable to produce highly reliable secret information, such as highly reliable secret key bits. In particular, the bits of the helper data are indicative of reliable key bits.

The following description of certain embodiments of the invention will be made with reference to a delay-based PUF for illustration purpose only, the delay-based PUF measuring a delay difference between two paths (either corresponding to two distinct and identical paths of the PUFs or to two configurations of the same path), the helper data being generated from such delay difference (referred to hereinafter as a "DELTA value").

As used herein, the term "reliability" refers to the property of the PUF according to which the PUF 10 will always generate the same response for a given challenge, whatever environmental factors and thermal noise. The reliability can be expressed by the bit error rate, the bit error representing the difference between the expected response and the output response.

To generate each bit of a cryptographic key, the electronic system 100 according to certain embodiments of the invention, may operate according to two phases:

during an enrolment phase, a set of p challenge-response pairs CRPs are created (the p challenges are referred to hereinafter as p enrolled challenges with p being at least equal to one). Then, a helper data comprising at least p bits is generated by applying the p challenges, each challenge being used to generate a bit of the helper data. For each challenge, the delay difference ("DELTA value") obtained at the PUF output in response to the applied challenge is measured, and the helper data bit is determined from the DELTA value using at least one reliability threshold. The set of challenges and the helper data thus obtained may be stored, for example in a local non-volatile memory or in an external server.

In a usage phase, a p-bit cryptographic key may be extracted by applying the p enrolled challenges; for each enrolled challenge, a key bit may be determined from the helper data bit corresponding to the applied challenge and from the delay difference ("DELTA" value) output by the PUF in response to the challenge applied during the usage phase, without requiring necessarily use of error correction.

The system 100 may be configured to apply at least one bit extraction function to generate each helper data bit, each bit extraction function being configured to return a bit value depending on a condition related to the physical variable difference.

In certain embodiments, the generation of each helper data bit and of each cryptographic key may depend on the selection of a bit extraction function out of at least two extraction functions, the selection of the bit extraction function being determined from the DELTA value obtained for the applied challenge (during the enrolment phase for the helper data bit generation and during the usage phase for the cryptographic key bit). Each bit extraction function provides a bit value depending on a condition related to the DELTA value measured in the considered phase (enrolment or usage phase).

The helper data bits may be generated so that each bit value is indicative of the bit extraction function that was used to generate the helper data bit, such information being usable to generate secret information.

As a result, the helper data thus generated does not reveal any information about the secret key. It further ensures that the key will remain the same, each time the key is derived.

Embodiments of the invention are not limited to key generation and encompass all cryptographic applications in which a helper data is used. In other applications of the invention, the helper data generated from the delta variable value may be used for example for authentication, key storage, tamper resistance, copy protection where a content key is obtained from a PUF, etc. The following description will be made with reference to key generation for illustration purpose only.

In one embodiment, as depicted in FIG. 1, the electronic system 100 may comprise a helper data generator 2. The helper data generator 2 may generate the helper data from the DELTA value provided by the PUF 10.

The helper data generator 2 may be configured to generate a helper data comprising a set of bits, a bit of the helper data being generated in association with each applied challenge. The helper data generator 2 may be configured to generate each helper data bit from the physical variable difference (DELTA value) provided by the PUF in response to the application of the associated challenge.

The system 100 may further comprise a secret information extractor 3 configured to extract secret information. In one possible application to key generation, a secret information extractor may be provided to extract a secret key bit from the helper data generated during the enrolment phase. In one embodiment, the secret key bit may be extracted from the helper data using the same bit extraction function as the one used to generate the corresponding helper data bit, during the enrolment phase.

The cryptographic key thus generated can be used in various cryptographic applications. In the example of FIG. 1, electronic system 100 may comprise a cryptographic device 4 (also called "crypto engine" in the art) which receives the cryptographic key generated from the helper data as an input. The cryptographic device 4 may use the key for example for authentication applications.

The helper data generator 2 may comprise a bit extraction function selector 20 configured to select a bit extraction function among at least a first bit extraction function 21 and a second bit extraction function 22 depending on the value of the physical variable difference and at least one reliability threshold (S, S1, S2).

The bit extraction function selector 20 may be configured to select one bit extraction function among at least two bit extraction functions 21 (also referred to as "M1") and 22 (also referred to as "M2"), the selected bit extraction function being used for generating a helper data bit in association with a challenge applied, during the enrolment phase, depending on the value of the DELTA value corresponding to the applied challenge.

In certain embodiments, the bit extraction function selector 20 may be configured to select one of the bit extraction functions depending on a condition related to the physical variable difference.

In one embodiment for example, the bit extraction function selector 20 may be configured to select:

the first bit extraction function, if the physical variable difference is located in at least one small predefined interval, each interval being centered at a given value (the physical variable difference being thus close to the given value), the second bit extraction function, if the physical variable difference is located in at least one small predefined interval centered on another given value derived from the one or more reliability thresholds (the physical variable difference being thus close to the given value derived from the reliability threshold(s)).

In some embodiments, each helper data bit may be determined from the DELTA value using one reliability threshold S. The reliability threshold S may be chosen to be superior or equal to n (S>2n), n designating the maximum noise level. It is assumed that noise exists in the interval [DELTA−n, DELTA+n] for a given DELTA value.

The first bit extraction function 21 may provide a bit value depending on a condition related to the sign of the physical variable difference. The second bit extraction function 22 may provide a bit value depending on another condition related to the value of the physical variable difference with respect to the reliability threshold S.

In such embodiments, the selector 20 may be configured to select one bit extraction function among the first bit extraction function M1 (21) and the second bit extraction function M2 (22) by testing a condition related to the value of the DELTA value and to the reliability threshold S. More specifically, the selector 20 may be configured to select:

the first bit extraction function M1 (21), if the value of the DELTA is close to −S or S (i.e. if the DELTA value is located in a first small interval centered at minus the reliability threshold −S or in a second small interval centered at the reliability threshold S), which amounts to whether the DELTA value is included in the interval [−S−n, −S+n] or [S−n, S+n];

the second bit extraction function M2 (22), if the value of the DELTA is close to zero (i.e. if the DELTA value is located in a third small interval centered at zero), in other words if the DELTA value is in the interval [−n, n] (i.e. the range of the first and second intervals is equal to the double of the maximum noise level 2n).

otherwise (if the DELTA value is out of all the above intervals), one of the bit extraction functions M1 and M2 may be selected, for example randomly.

As used herein, a DELTA value is said to be "close to" a specified value, if the DELTA value is located in a range [−n, n] around the specified value, n representing the maximum noise level.

Each bit extraction function M1 or M2 provides a bit as a function of the DELTA variable value.

Figure 3:
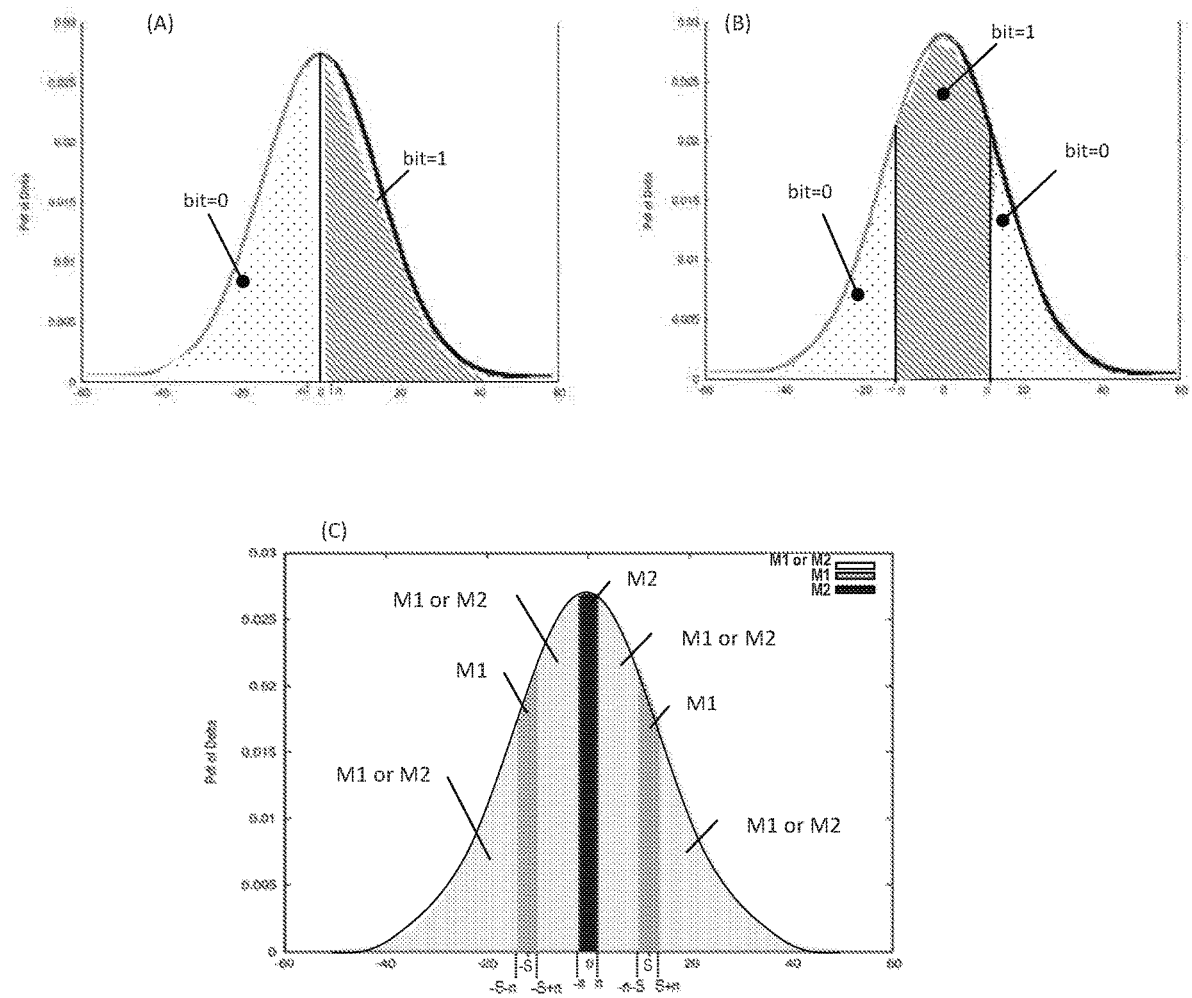
FIG. 3 shows three diagrams representing the probability distribution of the time difference measured at the PUF and illustrating the selection of the bit extraction functions according to certain embodiments.

In one embodiment, as illustrated in FIG. 3, the first bit extraction function M1 may returns a bit value depending on the sign of the DELTA variable.

The second bit extraction function M2 may return a bit value depending on the value of the DELTA variable with respect to the reliability threshold S. In particular, it may determine the bit value by testing a condition related to the DELTA value with respect to −S and S.

In such embodiment, the first bit extraction function M1 (21) may be defined such that:

the value of the extracted bit $b_i$ is set to one ($b_i=1$) if the DELTA value is strictly positive (DELTA>0).

Otherwise, if the DELTA value is negative or null (DELTA≤0), the value of the bit $b_i$ is set to the value zero ($b_i=0$).

Further, the second bit extraction function M2 (22) may be defined such that:

the value of the extracted bit $b_i$ is set to zero ($b_i=0$) if the DELTA value is less than −S (i.e. strictly inferior to −S) or greater than S (i.e. strictly superior to S): DELTA<−S or DELTA>S;

Otherwise, if the DELTA value is included in the interval [−S,S], the value of the extracted bit $b_i$ is set to the value one ($b_i=1$).

Compared to conventional fuzzy extraction that usually uses a helper data which is a code word and a key extraction which is based on a decoder for the error correcting code, the helper data bits obtained with M1, according to certain embodiments, involves no complexity for the key extraction as it is sufficient to consider the bits at '1' of the helper data. However, the number of key bits extracted by means of the helper data generated with the first bit extraction function M1 may not be constant, as the number of reliable bits may depend on the fabrication process and may be thus unpredictable.

The secret information extractor 3 overcomes the situation by using the helper data generated with the bit extraction functions M1 and M2, according to certain embodiments. During the usage phase, p enrolled challenges may be applied, which provides a DELTA value for each challenge. For each applied challenge, the secret information extractor 3 may use an auxiliary bit extraction function 30 configured to read, during the usage phase, the helper data bit corresponding to the applied challenge, and determine a bit extraction function to be applied from the helper data bit depending on the read value. If the value of the helper data bit is '0', the first bit extraction function M1 (21) is applied to generate the key bit corresponding to the challenge, using the DELTA value measured for the challenge during the usage phase. Otherwise, If the value of the helper data bit is '1', the second bit extraction function M2 (22) is applied to generate the key bit corresponding to the challenge, using the DELTA value measured for the challenge during the usage phase.

In some embodiments, the helper data generator may include a Reliability Threshold generator 5 for selecting the reliability threshold S in the enrolment phase from the probability distribution of the DELTA values measured in response to the application of the enrolled challenges. In particular, the reliability threshold generator may determine the reliability threshold S during the enrolment phase from a condition related to the probability that the physical variable difference takes a value strictly inferior to minus the reliability threshold −S or strictly superior to said reliability threshold S (Prob(DELTA<−S or DELTA>S)), this condition being satisfied if this probability is equal to a predefined probability value Pt, said predefined probability value being strictly inferior to one (Pt<1). Such condition is defined by formula (1):

$$\text{Prob}(DELTA<-S \text{ or } DELTA>S)=Pt \qquad (1)$$

Accordingly, the reliability threshold S may be determined such that the probability for the DELTA value to take a value strictly inferior to −S(minus S) or strictly superior to S is equal to the predefined probability value Pt.

In an embodiment, the predefined probability value Pt may be selected in the vicinity of 0.5 (½). In particular, the predefined probability value Pt may be set to ½ (0.5). The following description of some embodiments will be made mainly with reference to a predefined probability value Pt equal to ½, although the skilled person will readily understand that other values may be chosen.

The threshold S may be then determined such that the probability of the DELTA value takes a value strictly inferior to −S or strictly superior to S is equal to ½:

$$\text{Prob}(DELTA<-S \text{ or } DELTA>S)=½ \qquad (2)$$

This corresponds to the value 0.67449 of the standard deviation SIGMA of the DELTA distribution. Thus S may be determined as the product of the factor 0.67449 with SIGMA.

Alternatively, a reliability threshold satisfying condition (1) may be pre-computed and input to the helper data generator 2.

The helper data generator 4 thus allows a selection of the best bit extraction function during the enrolment phase, without requiring complex hardware implementation, and accordingly generation of reliable key bits.

FIG. 3 shows three diagrams A, B and C representing the distribution of the PUF physical output. The y-axis represents the probability of having a particular DELTA variable value (Probability Distribution Function pdf) and the x-axis represents the DELTA variable values.

Diagram A illustrates the bit values assigned by the first bit extraction function as a function of the DELTA variable.

Diagram B illustrates the bit values assigned by the second bit extraction function as a function of the DELTA variable and the reliability threshold.

Diagram C illustrates the selection of a bit extraction function among M1 and M2 according to some embodiments of the invention.

In one embodiment, as shown in FIG. 3, the distribution of a delay-based PUF follows a centered normal law (approximately Gaussian). The diagrams of FIG. 3 consider a distribution of the delta variable and the noise. For a high reliability PUF, it is desirable that the central area marked in black be as narrow as possible as this area corresponds to more unreliable data (unreliable data). In the example of FIG. 3, the chosen position of the threshold value S is determined such that the probability that the DELTA value takes a value strictly inferior to −S or strictly superior to S is equal to ½, according to formula (1): Prob(DELTA<−S or DELTA>S)=½.

As shown in the diagram C of FIG. 3:

If the delta value is close to zero 0 (included in [−n, n]), the extractor M2 (22) is used;

If delta value is close to −S or S (included in [−n−S, −S+n] or [−n+S, S+n]), the extractor M1 (21) is used;

otherwise, one of the bit extraction functions M1 and M2 may be used randomly.

As shown in this example, there is always a bit extraction function M1 or M2 which allows being sufficiently distant from the unreliable area (central narrow area marked in black in FIG. 3). In such example, this warranties the reliability of the bits delivered by the helper data generator 2.

The helper data thus obtained does not provide any information on the key bit since the relationship Prob (DELTA<-S or DELTA>S)=½ is satisfied. In other words, this means that the probability that a key bit takes a value equal to '1' (one), knowing the helper data bit, is equal to the probability that a key bit takes a value equal to '0' (zero), knowing the helper data bit, both probability functions being equal to ½:

$$\text{Prob(bit='1'knowing the helper bit)=Prob(bit='0'knowing the helper bit)}=\tfrac{1}{2} \quad (3)$$

It is an advantage of the invention to bring robustness against an attack. If an attacker modifies the helper data, he will not be able to retrieve any information.

In an alternative embodiment, each helper data bit may be determined from the DELTA value using a pair of reliability thresholds comprising a first reliability threshold S1 and a second reliability threshold S2.

The reliability thresholds S1 and S2 may be such that the first reliability threshold S1 is strictly higher to S2+2n (S1>S2+2n), with n designating the maximum noise level. It is assumed that noise exists in the interval [DELTA-n, DELTA+n] for a given DELTA value.

In such embodiments, the selector 20 may be configured to select one bit extraction function among a first bit extraction function M'1 (21) and a second bit extraction function M'2 (22) by testing a condition related to the value of the DELTA value and to the reliability thresholds (S1,S2).

Each bit extraction function 21, 22 may provide a bit value depending on another condition related to the value of the physical variable difference with respect to values derived from the first and second reliability threshold S1 and S2.

More specifically, the selector 20 may be configured to select:

the first bit extraction function M'1 (21), if the value of the DELTA (physical variable difference) is close to −S2 or S1 (i.e. if the DELTA value is located in a first small interval centered at minus the second reliability threshold −S2 or in a second small interval centered at the first reliability threshold S1); the value of the DELTA is considered to be close to −S2 or S1 if the DELTA value is included in the interval [−S2−n, −S2+n] or [S1−n, S1+n] (i.e. the range of the first and second intervals is equal to the double of the maximum noise level (2n)).

the second bit extraction function M'2 (22), if the value of the DELTA is close to −S1 or S2 (i.e. if the DELTA value is located in a third small interval centered at minus the first reliability threshold −S1 or in a fourth small interval centered at the second reliability threshold S2); the value of the DELTA is considered to be close to −S1 or S2 if the DELTA value is included in the interval [−S1−n, −S1+n] or [S2−n, S2+n] (i.e. the range of the third and fourth intervals is equal to the double of the maximum noise level (2n)).

Otherwise, if the DELTA value is out of the intervals [−S2−n, −S2+n], [S1−n, S1+n], [−S1−n, −S1+n] and [S2−n, S2+n], the selector 20 may be configured to select any of bit extraction function M'1 and M'2, for example randomly.

Each bit extraction function M'1 or M'2 provides a bit as a function of the DELTA variable value.

In such embodiments using a pair of reliability thresholds, the first bit extraction function M'1 (21) may be defined such that:

the value of the extracted bit $b_i$ is set to one ($b_i$=1) if the DELTA value is strictly superior to minus the first threshold −S1 and inferior to minus the second threshold −S2, with S1>S2>0.

Otherwise, the bit $b_i$ is set to the value zero ($b_i$=0).

The second bit extraction function M'2 (22) may be defined such that:

the value of the extracted bit $b_i$ is set to one ($b_i$=1) if the DELTA value is strictly superior to minus the second threshold −S2 and inferior to the first threshold S1, with S1>S2>0;

Otherwise, the bit $b_i$ is set to the value zero ($b_i$=0).

Figure 2:
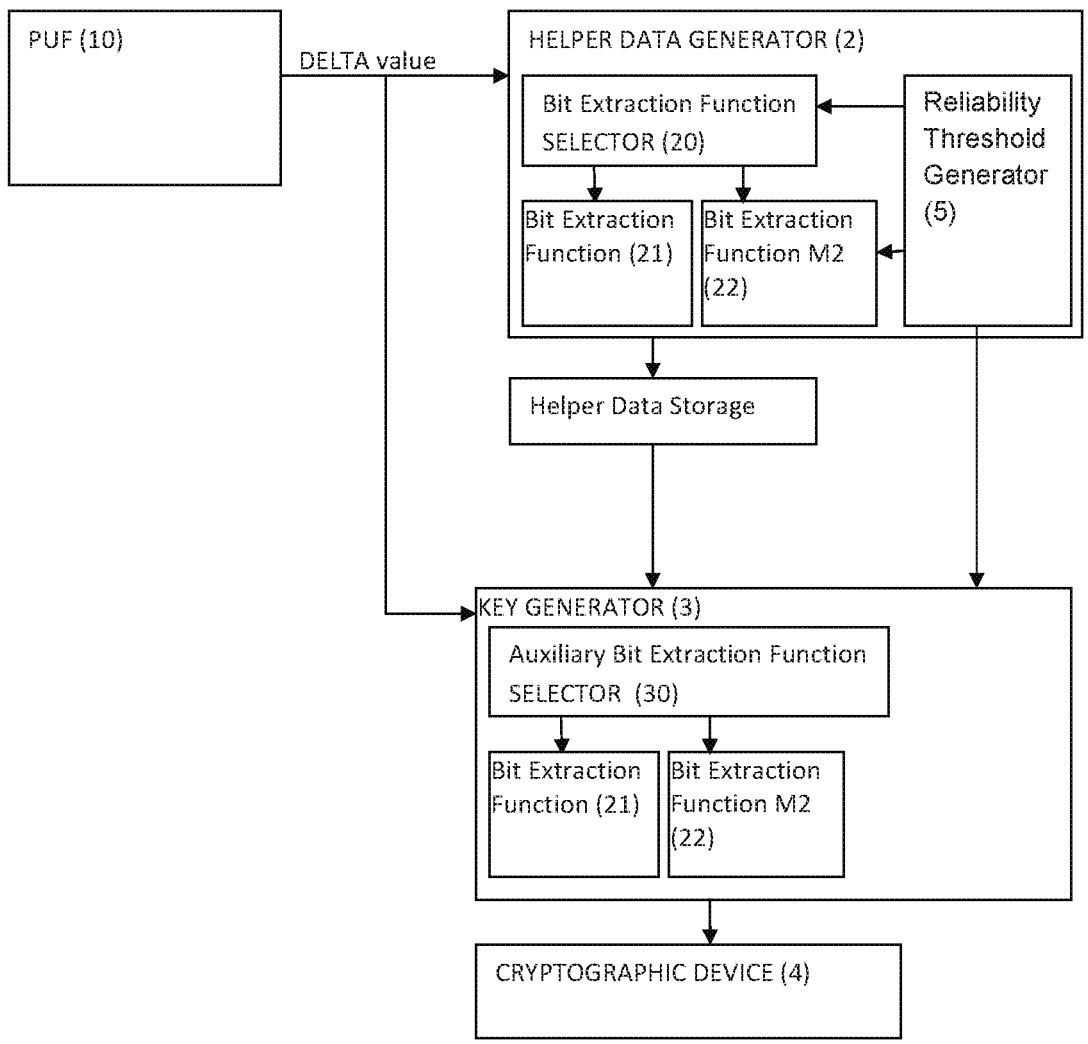
FIG. 2 shows the structure of the helper data generator, according to certain embodiments.

The Reliability Thresholds generator 5 (shown in FIG. 2) may be configured to select the first and second reliability thresholds S1 and S2 in the enrolment phase, from the probability distribution of the delta values measured in response to the application of the enrolled challenges. In particular the reliability threshold generator 5 may determine each threshold Si such that the probability that the DELTA value takes a value strictly inferior to −Si or strictly superior to Si is equal to a predefined probability value Pti. The predefined probability value Pti may be strictly inferior to 1. Accordingly, the first threshold S1 (i=1) may be defined such that the probability that the DELTA value takes a value strictly inferior to −S1 or strictly superior to S1 is equal to a first predefined probability value Pt1 (Pt1 being strictly inferior to 1:

$$\text{Prob(DELTA<}-S1\text{or DELTA>}S1)=Pt1 \quad (4)$$

Similarly, the second threshold S2 (i=2) may be defined such that the probability that the DELTA value takes a value strictly inferior to −S2 or strictly superior to S2 is equal to a second predefined probability value Pt2 which is strictly inferior to 1:

$$\text{Prob(DELTA<}-S2\text{or DELTA>}S2)=Pt2 \quad (5)$$

Further, in some embodiments, the first and second thresholds may be further determined such that the probability that the DELTA value takes a value strictly inferior to −S1 or strictly superior to S2 is equal to a auxiliary probability value Pt12 which is strictly inferior to 1:

$$\text{Prob(DELTA<}-S1\text{or DELTA>}S2)=Pt12 \quad (6)$$

In some auxiliary probability value is a function of the sum of the first probability value and of the second probability value, the first probability value being higher than the second probability value In some embodiments, the probability values Pt1, Pt2 and Pt12 may satisfy:

$$\left.\begin{array}{l} Pt12 = 1/2(Pt1 + pt2) \\ 1 > Pt1 > Pt2 > 0 \end{array}\right\} \quad (7)$$

In one embodiment, the predefined probability value Pt12 may be set to ½, with Pt1+Pt2 thus satisfying Pt1+Pt2=1. The thresholds S1 and S2 may then be determined such that the probability that the DELTA value takes a value strictly inferior to −S1 or strictly superior to S2 is equal to:

$$(\text{Prob(DELTA<}-S1\text{or DELTA>}S2)=\tfrac{1}{2} \quad (8)$$

Alternatively, two reliability thresholds S1 and S2 satisfying condition 1 may be pre-computed and input to the helper data generator 2.

The helper data generator 2 thus allows a selection of the best bit extraction function during the enrolment phase, without requiring complex hardware, and accordingly generation of reliable key bits.

Figure 4:
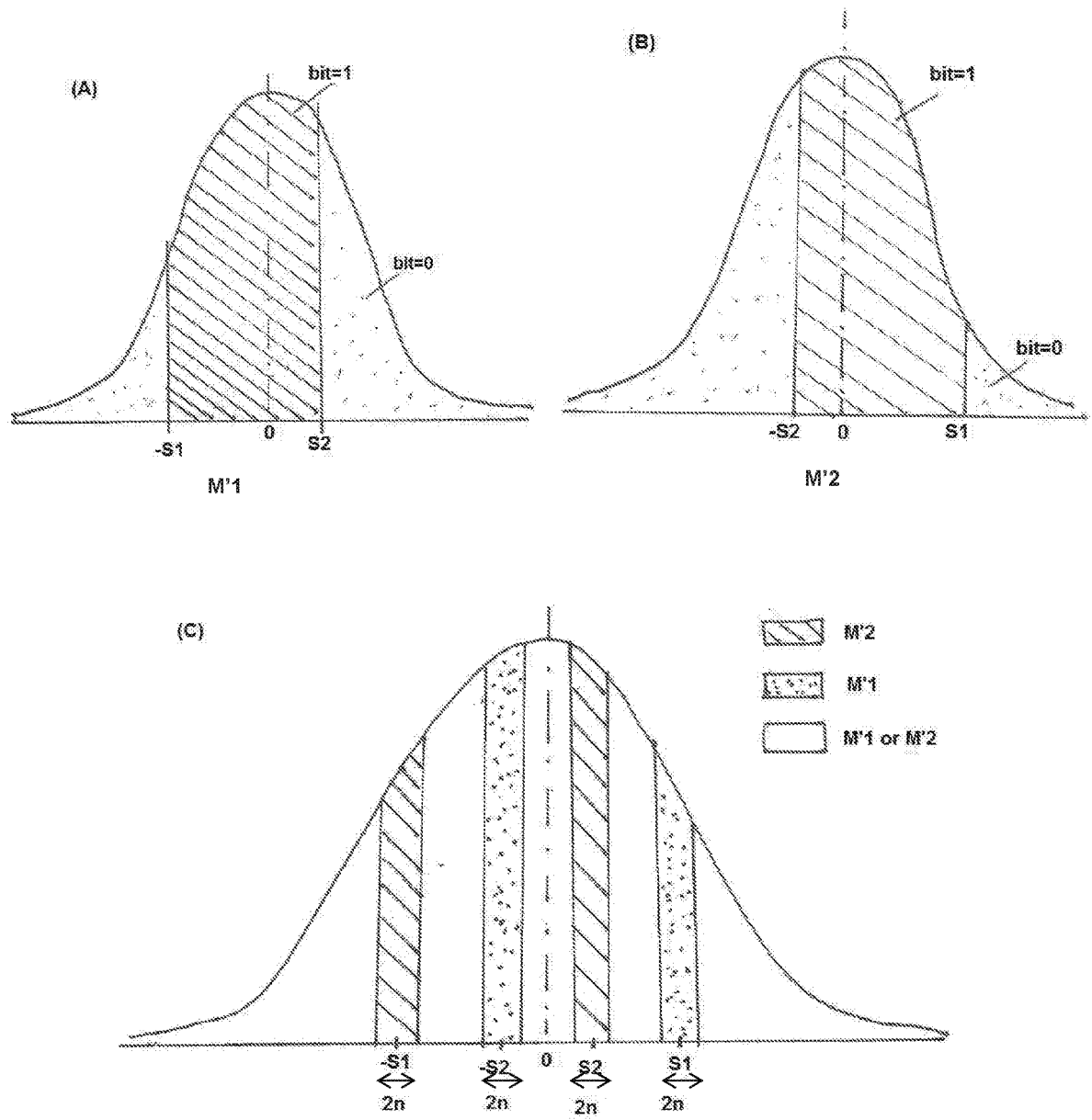
FIG. 4 shows three diagrams representing the distribution of the PUF physical output, according to another embodiment.

FIG. 4 shows three diagrams A, B and C representing the distribution of the PUF physical output. The y-axis represents the Probability to have a particular DELTA variable value and the x-axis the DELTA variable values.

Diagram A illustrates the bit values assigned by the first bit extraction function M'1 as a function of the DELTA variable.

Diagram B illustrates the bit values assigned by the second bit extraction function M'2 as a function of the DELTA variable and the reliability threshold.

Diagram C illustrates the selection of a bit extraction function among M'1 and M'2 according to embodiments of the invention.

As shown in FIG. 4, the distribution of a delay-based PUF is represented as a centered normal law (approximately Gaussian). In the example of FIG. 4, the position of the threshold values S1 and S2 are determined by the probability that the DELTA value takes a value strictly inferior to −S1 or strictly superior to S2 is then equal to:

$$\text{Prob}(\text{DELTA}<-S1 \text{ or } \text{DELTA}>S2)=\tfrac{1}{2} \qquad (9)$$

As shown in the diagram C of FIG. 4:

If the delta value is closed −S1 or S2 (included in the +/−n interval around −S1 or S2), the extractor M'2 (22) is used;

If delta value is closed to −S2 or S1 (included in the +/−n interval around −S2 or S1), the extractor M'1 (21) is used;

otherwise, one of the bit extraction functions M'1 and M'2 may be used randomly.

Accordingly, in this embodiment also, there is always a bit extraction function 21 or 22 which allows being distant from the unreliable area, thereby ensuring reliable of helper data bits.

The helper data thus obtained does not provide any information on the key bit if the condition Prob(DELTA<−S1 or DELTA>S2)=½ is satisfied. In other words, this means that the probability that a key bit takes the value '1', knowing the helper data bit, is equal to the probability that a key bit takes the value '0', knowing the helper data bit, both being equal to ½, according to formula (3):

$$\text{Prob}(\text{bit} = \text{`1'} \text{ knowing the helper bit}) = \text{Prob}(\text{bit} = \text{`0'} \text{ knowing the helper bit}) = 1/2$$

Therefore, in such embodiments also, if an attacker tries to modify the helper data, he will not be able to retrieve any information related to the key.

The following description of certain embodiments will be made with reference to an embodiment using a unique reliability threshold S and bit extraction function M1 and M2 as depicted in FIG. 3, for illustration purpose only. However, the skilled person will readily understand that the invention applies to other embodiments.

Figure 5:
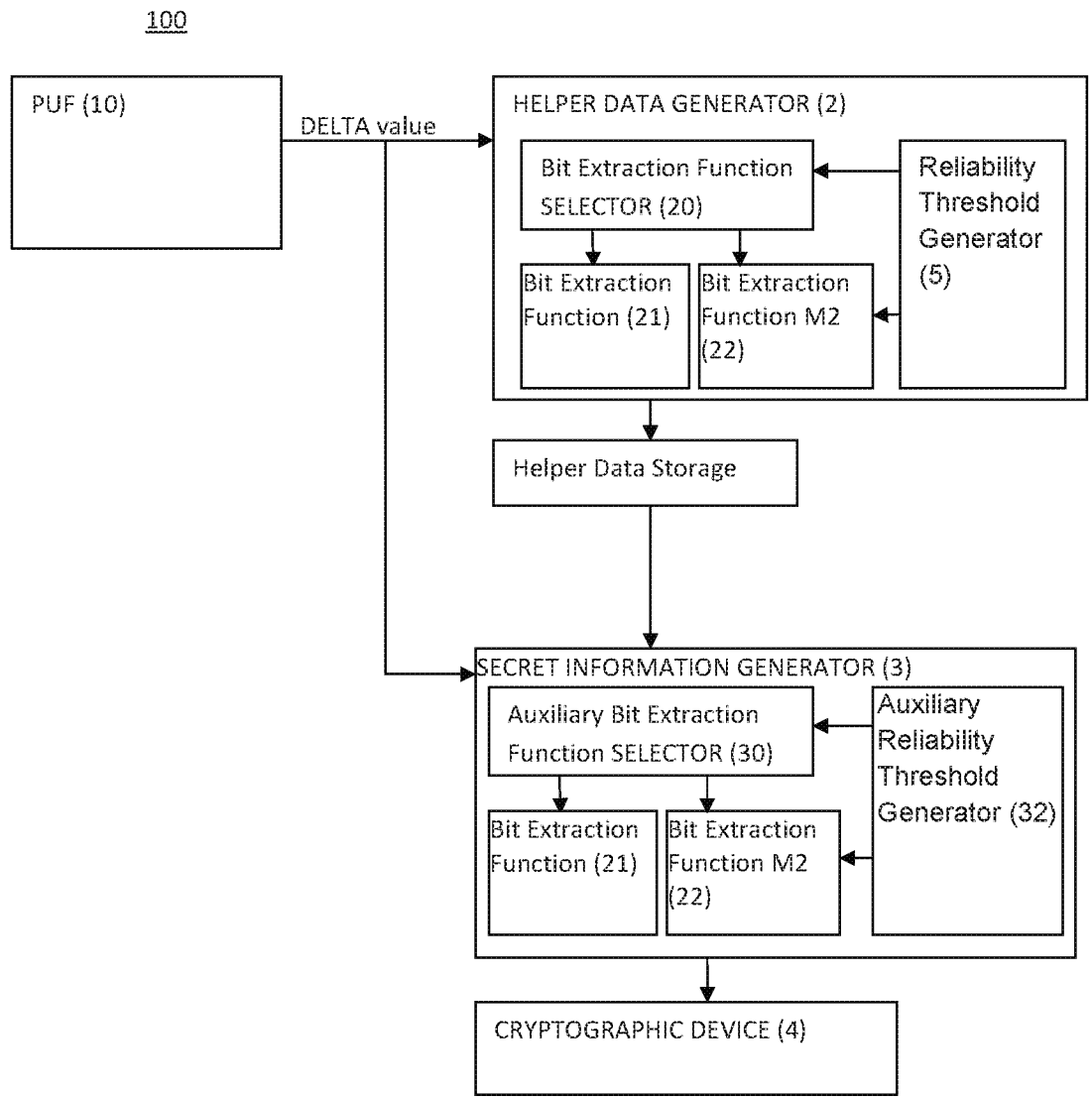
FIG. 5 represents an electronic system for generating secret information with a dynamic update the reliability threshold, according to one embodiment.

FIG. 5 depicts the electronic system 100 for generating helper data during the enrolment phase of the PUF, while taking into account environmental changes, according to another embodiment.

Changes in the environment of the delay-based PUF (environmental factors such as temperature or supply voltage variations) may result in a variation of the threshold value S.

In order to avoid the impact of environmental changes on the threshold value S (which would in turn impact the reliability of the PUF), the key extractor 3 may further comprise an auxiliary reliability threshold generator 32 for dynamically correcting the threshold S, during the usage phase.

The reliability threshold corrector 32 may be configured to update the value of the threshold S using a reference threshold $S_{ref}$ representing the current threshold value and a reference time ($T_{ref}$).

The reference values, $T_{ref}$ and $S_{ref}$, may be generated during the enrolment phase. The reference time $T_{ref}$ represents a specific time of the delay chain which may be obtained with a given and public reference challenge (for instance a challenge equal to 0).

The reference threshold $S_{ref}$ may be determined by calculating the standard deviation SIGMA of the DELTA distribution. To meet the property according to which (Prob (DELTA<−S or DELTA>S)=Pt), with Pt being for example equal to ½, the threshold $S_{ref}$ may be substantially equal to the product of SIGMA with a selected factor inferior to one. The selected factor is preferably equal to 0.6745 (hence $S_{ref}$=0.6745 SIGMA), as the impact of the environment on $T_{ref}, S_{ref}$ and DELTA is the same.

In certain embodiments, the helper data generator 4 may insert the reference threshold $S_{ref}$ and the reference time $T_{ref}$ in the helper data generated during the enrolment phase. In such embodiment, the helper data may include a concatenation of two bit portions:

a first portion comprising the p helper data bits generated by the helper data generator using the bit extraction function M1/M2, a second portion comprising the reference values $S_{ref}$ and $T_{ref}$.

The reference values are thus embedded in the helper data.

Alternatively, the helper data may be stored in association with the reference values using a data structure in storage 5. Such data structure may comprise for each entry a triplet of values including:

the helper data bits, the reference threshold ($S_{ref}$), and the reference time ($T_{ref}$).

In such embodiments, the helper data thus embeds (or is associated with), the reference time $T_{ref}$ at which the measurement is made and indirectly the frequency value. If new conditions appear, for example, on the temperature or voltage and impact the reference conditions, the detected changes may be dynamically applied to S.

More specifically, the auxiliary threshold generator 32 may determine the value of the reliability threshold S at each usage phase, by applying a correction factor to the reliability threshold $S_{ref}$. The correction factor may depend on the measured time $T_{meas}$, representing the time measured with the public reference challenge in usage phase, and on the absolute reference time $T_{ref}$ included in the helper data.

In some embodiments, the correction factor may be defined by the ratio $T_{meas}/T_{ref}$ where $T_{meas}$ represents the time measured for the same reference challenge as for the reference time $T_{ref}$. The reliability threshold S may be determined as follow:

$$S = S_{ref} \times \frac{T_{meas}}{T_{ref}} \qquad (10)$$

In order to avoid attacks on the helper data, in some embodiments, the reference parameters $S_{ref}$ and $T_{ref}$ may be encoded. In one embodiment, the reference parameter $S_{ref}$ and $T_{ref}$ may be concatenated with the key bits obtained using the first bit extraction function M1 (21) by applying an exclusive OR operation. As the bit extraction function M1 is independent on the reliability S, the reference values $S_{ref}$ and $T_{ref}$ can be decoded by XORING them with the key bits obtained using the first bit extraction function M1.

In another embodiment, the auxiliary reliability threshold generator 32 may determine the reliability threshold in the usage phase using the probability distribution of the DELTA values measured for the p challenges applied during the usage phase. In such embodiment, the helper data may only comprise the helper data bits generated with the bit extraction function M1/M2 without embedding reference values $S_{ref}$ and $T_{ref}$. To limit the impact of environmental changes on the PUF, the threshold value S may be computed, in one embodiment, at each usage phase, such that the probability that the absolute value of the DELTA variable takes a value greater than the threshold S is equal to a predefined probability value Pt' inferior to one:

$$\text{Prob}(|\text{Delta}|>S)=Pt' \quad (11)$$

In a preferred embodiment, the predefined probability value Pt' is equal to ½.

This reliability threshold S may be determined by:
calculating the standard deviation SIGMA of the DELTA distribution corresponding to the DELTA values measured for the p challenges applied during the usage phase,
determining S by multiplying SIGMA by a selected factor inferior to one; in an exemplary embodiment, the selected factor may be advantageously equal to 0.6745 (S=0.6745 SIGMA) to satisfy the probability condition on DELTA, in particular Prob(DELTA<−S or DELTA>S)=½, according to formula (1).

It should be noted that in embodiments using two threshold values S1 and S2, the probability condition may be the condition of formula (9):

$$\text{Prob}(DELTA<-S1 \text{ or } DELTA>S2)=½$$

Such embodiments of the invention ensure that there is no dependency between the helper data (public data) and the secret key bit. While the helper data generated ensure a high reliable PUF, they thus prevent access to the secret key.

The invention does not require necessarily the use of error correction for generating helper data.

Figure 6:
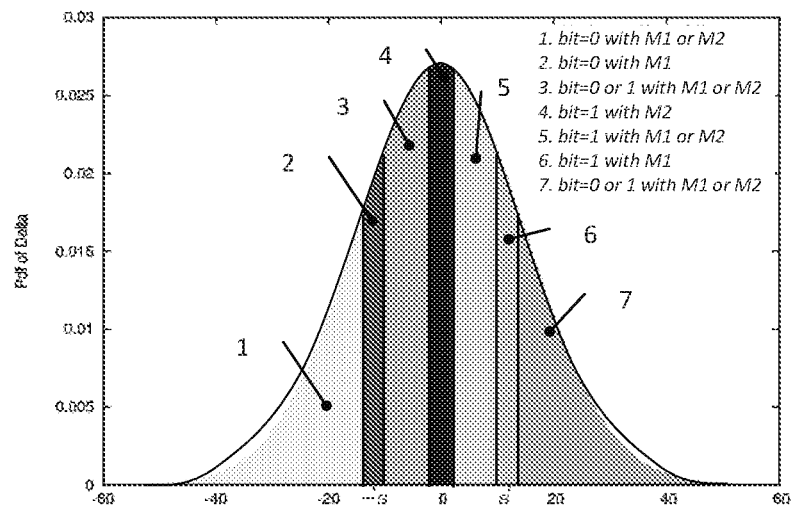
FIG. 6 shows a diagram representing the probability distribution of the time difference measured at the PUF, according to certain embodiments.

FIG. 6 shows a diagram illustrating the probability distribution of the PUF physical output. The y-axis represents the Probability to have a particular DELTA variable value (Probability Distribution Function pdf) and the x-axis the delta variable values.

In FIG. 6:
area 1 corresponds to Prob(bit=0|M1 or M2);
area 2 corresponds to Prob(bit=0|M1);
area 3 corresponds to Prob(bit=0 or 1|M1 or M2);
area 4 corresponds to Prob(bit=1|M2);
area 5 corresponds to Prob(bit=1|M1 or M2);
area 6 corresponds to Prob(bit=1|M1);
area 7 corresponds to Prob(bit=0 or 1|M1 or M2).

As used herein, Prob(bit=val|Mi) refers to the probability that a key bit is equal to the value val, knowing that extractor Mi is used (with i=1 or 2).

As shown in FIG. 6, the probability to have any of the bit value '0' or '1' with any of the extractors M1 or M2 is substantially equal to ½.

Some embodiments of the invention allow the selection of the best extraction method during the enrolment phase, without requiring complex hardware unlike prior art solution.

Figure 7:
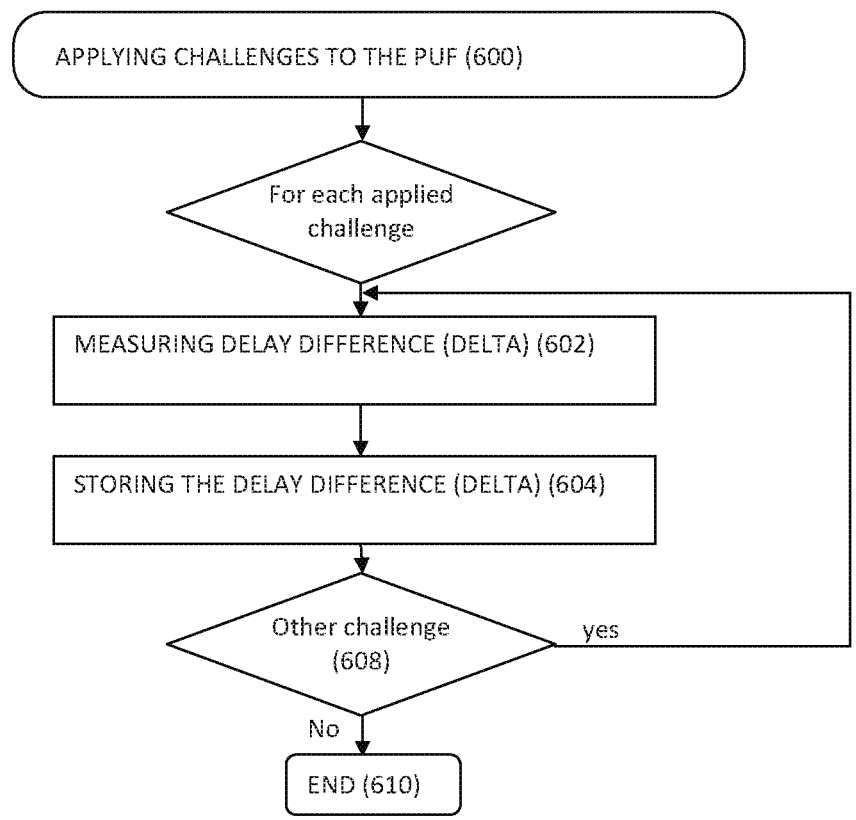
FIG. 7 depicts a preliminary phase of the helper data generation method, according to certain embodiments.

FIG. 7 depicts a preliminary phase of the helper data generation method, according to certain embodiments. During this preliminary phase, the DELTA value distribution may be generated according to the following steps.

The helper data is generated during the enrolment phase by applying a set of challenges to the PUF 10 at step 600.

At step 602, for each applied challenge, the DELTA value is measured at the output of the PUF 10.

At step 604, the DELTA value is stored in a storage unit.

Steps 602 and 604 are iterated for each applied challenge (block 608).

The storage unit thus obtained may be used to determine a probability distribution of the DELTA value.

Figure 8:
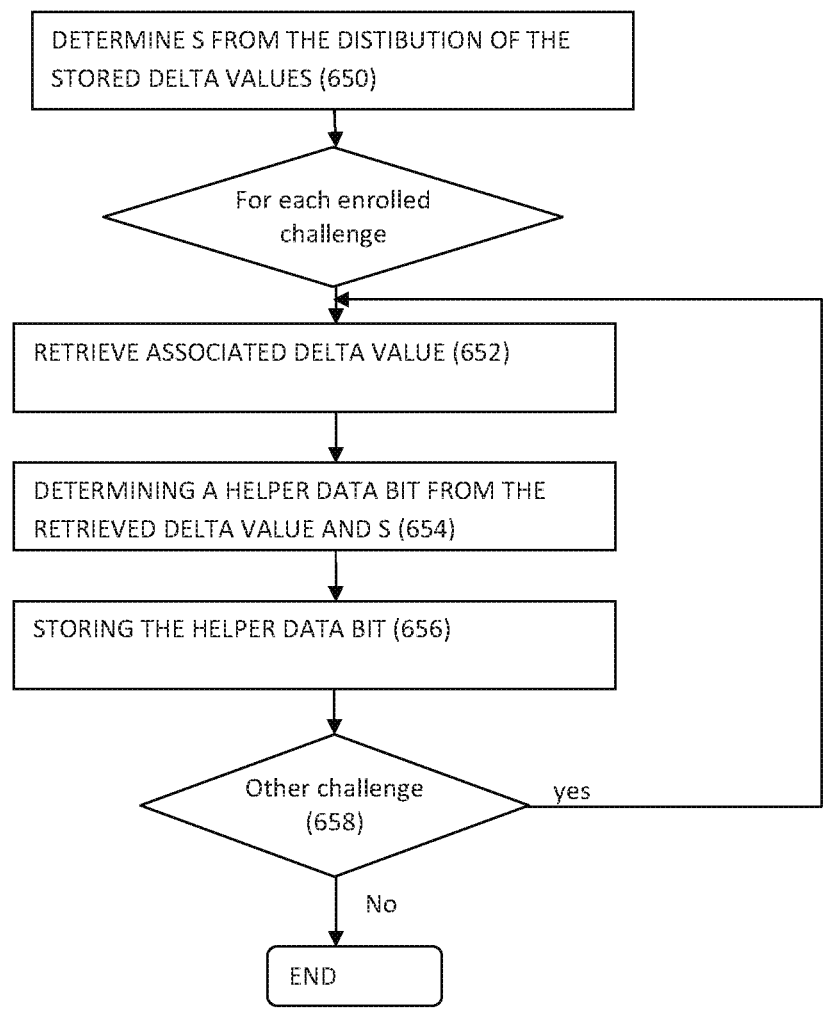
FIG. 8 is a flowchart of a helper data generation method, according to certain embodiments.

FIG. 8 is a flowchart depicting the helper data generation method, using the DELTA values measured during the enrolment phase (FIG. 7), according to certain embodiments.

At step 650, the reliability threshold is determined from the distribution of the stored data values.

For each i-th challenge applied during the enrolment phase (as described according to FIG. 7), the DELTA value associated with the challenge is read from the storage unit, at step 652.

At step 654, the i-th helper data bit of the helper data associated with the current challenge is determined from the DELTA value obtained for the challenge and a reliability threshold S.

At step 656, the helper data bit is stored in the bit position i of the helper data.

Steps 652 to 656 are iterated for the other challenges (block 658) until all challenges have been obtained.

The helper data thus obtained comprises at least p bits corresponding to the p challenges. Additional information may be inserted to the helper data such as reference threshold and time values.

Figure 9:
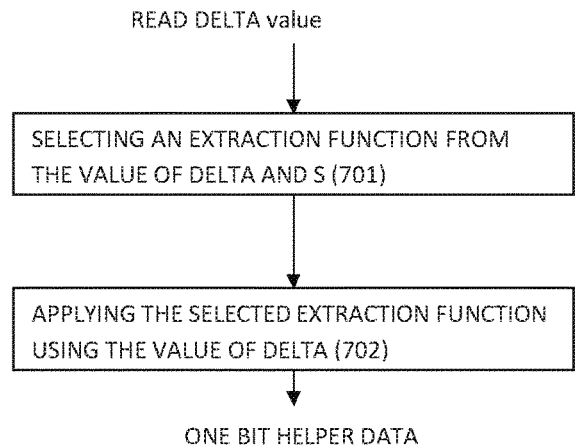
FIG. 9 is a flowchart depicting the helper data bit determination, according to certain embodiments.

FIG. 9 is a flowchart depicting the helper data bit determination step of FIG. 8 (step 654), according to certain embodiments from the DELTA value obtained for a current challenge.

At step 701, a bit extraction function is selected by testing a condition related to the DELTA value obtained for the current challenge and the reliability threshold.

At step 702, the selected bit extraction function (M1 or M2 depending on the selection) is applied, which provides the helper data bit associated with the current challenge.

Figure 10:
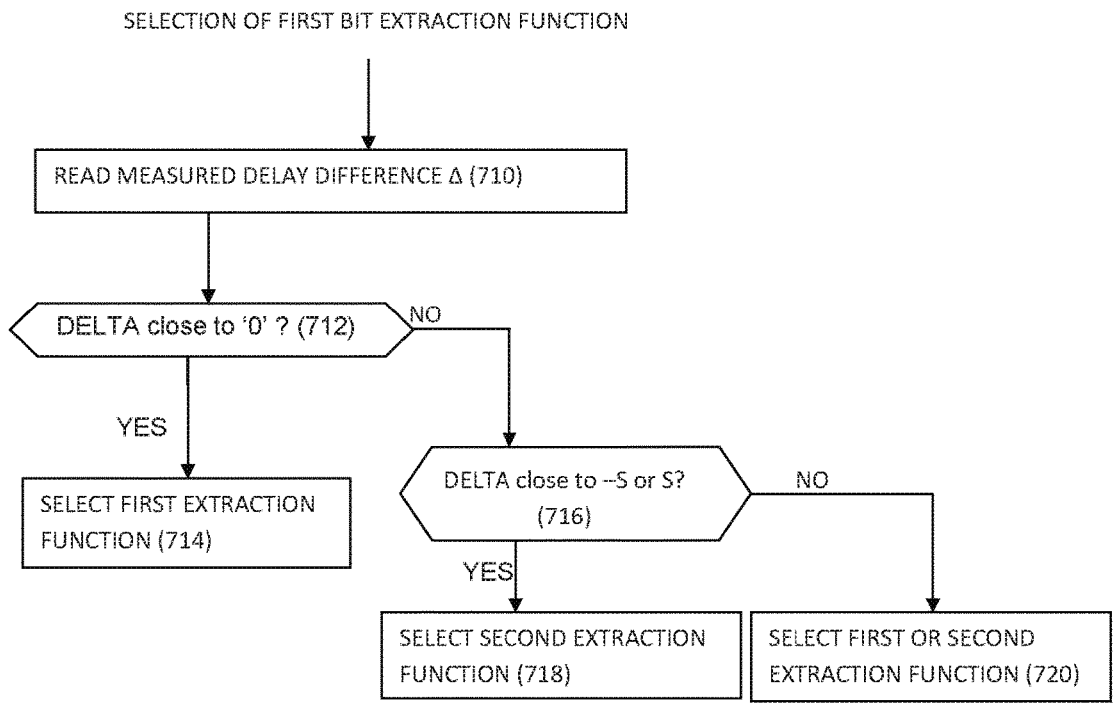
FIG. 10 depicts the bit extraction selection implemented during the enrolment phase, according to one embodiment.

FIG. 10 depicts the bit extraction selection step of FIG. 9 implemented for a current challenge during the enrolment phase, according to one embodiment.

At step 710, the DELTA variable obtained for the current challenge is read.

At step 712, it is determined if the DELTA variable is close to zero (0) (in particular if the DELTA variable is included in [−n, n]). If so, the first extraction function M1 is selected at step 714.

Otherwise, it is determined if the DELTA variable is close to −S or S (in particular, if the DELTA variable is included in [−n−S, −S+n] or [−n+S, S+n]), at step 716. If so, the second extraction function M2 is selected at step 718. Otherwise, the first or second extraction function is selected, for example randomly at step 720.

Figure 11:
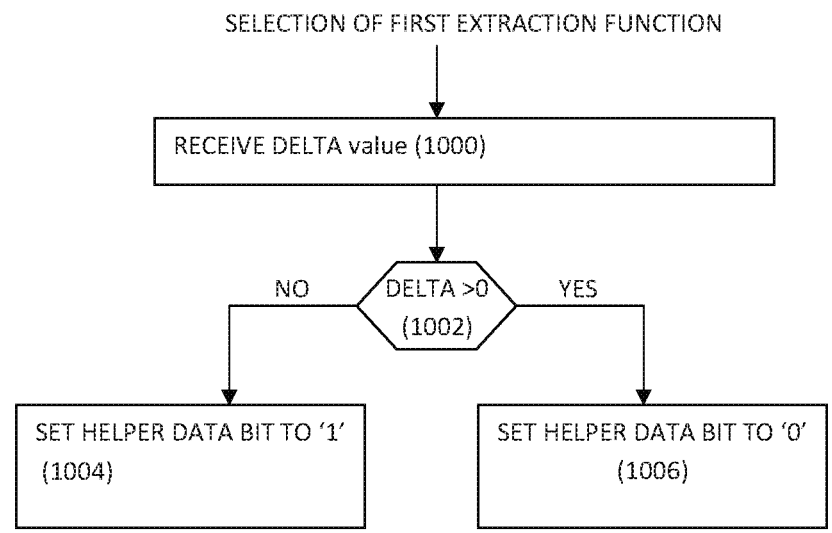
FIG. 11 depicts the step of applying the first selection extraction method, during the enrolment phase.

FIG. 11 depicts the step of applying the first extraction method M1 (step 714 of FIG. 10), for a current challenge.

At step 1000, the DELTA value associated with the current challenge is read.

At step 1002, it is determined if the DELTA value is positive. If so, the helper data bit corresponding to the current challenge is assigned a '1' value (step 1004). Otherwise, if the DELTA value is negative or null, the helper data bit corresponding to the current challenge is assigned a '0' value (step 1006).

Figure 12:
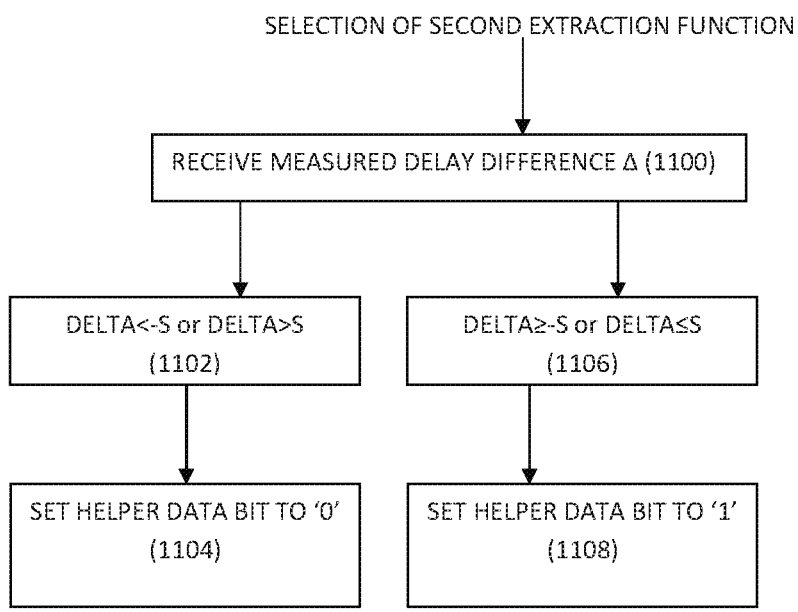
FIG. 12 depicts the step of applying the second selection extraction method, for a current challenge.

FIG. 12 depicts the step of applying the second selection extraction method M2 (step 718 of FIG. 10), for a current challenge.

At step 1100, the DELTA value associated with the current challenge is read.

At step 1102, it is determined if the DELTA value is strictly inferior to −S or strictly superior to S. If so, the helper data bit corresponding to the current challenge is assigned a '0' value (step 1104). Otherwise, if the DELTA value is negative, the helper data bit corresponding to the current challenge is assigned a '1' value (step 1106).

Figure 13:
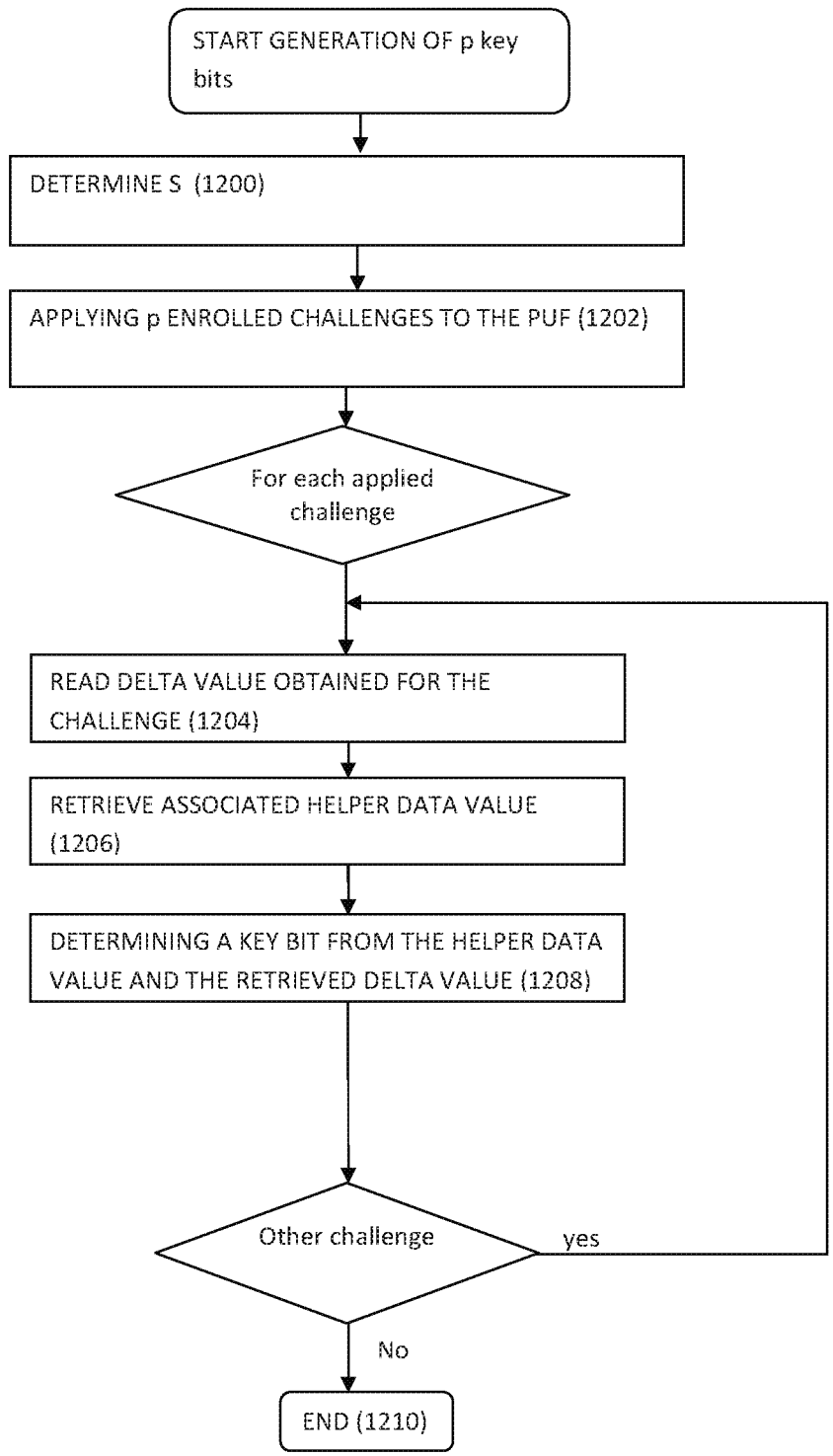
FIG. 13 depicts the key generation method implemented during a usage phase, according to one embodiment.

FIG. 13 depicts the key generation method implemented during a usage phase from the helper data according to one embodiment.

At step 1200, the reliability threshold is determined by applying a correction factor depending on reference values $S_{ref}$, $T_{ref}$ and on a measured time $T_{meas}$.

A set of p enrolled challenges are then applied to the PUF (block 1202).

For each current challenge (i-th challenge), at step 1204, the DELTA value corresponding to the current challenge is measured.

At step 1206, the helper data bit corresponding to this current challenge is read.

At step 1208, a key bit is determined from the helper data bit and the DELTA value, the key bit thus obtained corresponding to the i-th key bit of the cryptographic key.

Steps 1204 to 1208 are iterated for the other challenges, which provides the p key bits of the cryptographic key.

Figure 14:
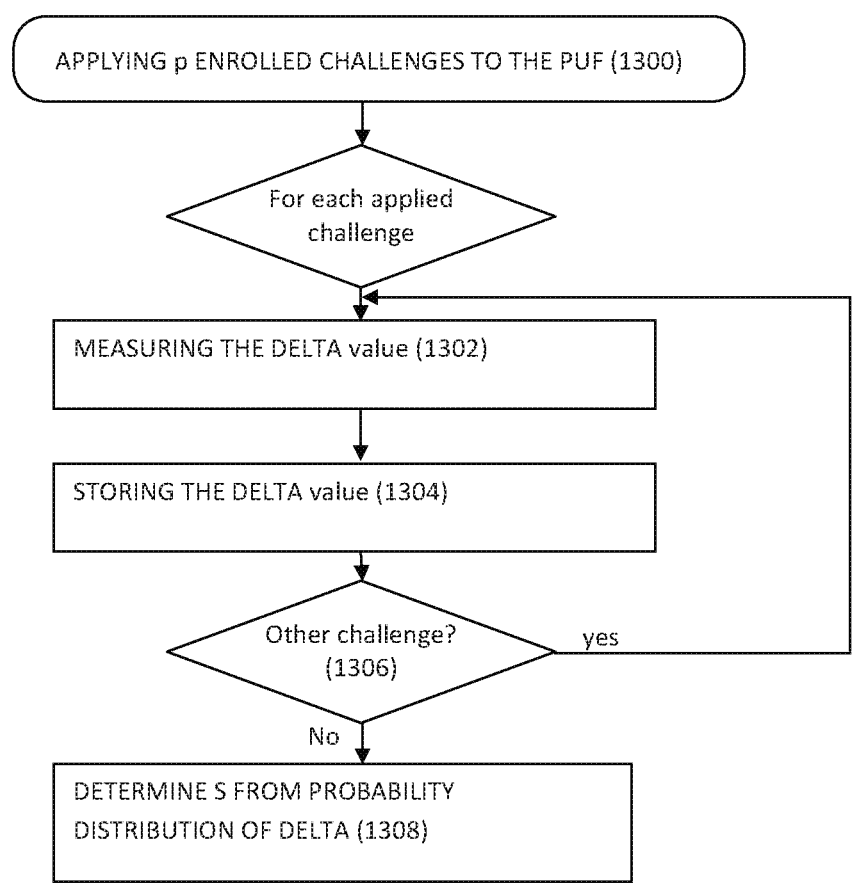
FIG. 14 depicts a preliminary phase of the key extraction method, according to another embodiment.

FIG. 14 depicts a preliminary phase of the key extraction method, according to another embodiment. During this preliminary phase of the usage phase, the DELTA values corresponding to p applied challenges are collected and the reliability threshold may be determined from a probability distribution of the DELTA values.

At step 1300, a set of p challenges to the PUF 10 at step 600.

At step 1302, for each applied challenge, the DELTA value is measured at the output of the PUF 10.

At step 1304, the DELTA value is stored in a storage unit.

Steps 1302 and 1304 are iterated for each applied challenge (block 1306).

At step 1308, S may be determined from the distribution of the DELTA values and in particular such that the probability that the absolute value of the DELTA variable takes a value greater than the threshold S is equal to a predefined value Pt' according to formula (11); accordingly in an embodiments where Pt' is equal to ½, S may be determined to satisfy the condition:

$$\mathrm{Prob}(|\mathrm{Delta}|>S)=\tfrac{1}{2} \quad (12)$$

This may include:
calculating the standard deviation SIGMA of the DELTA distribution corresponding to the DELTA values collected at step 1300 to 1306,
determining S by multiplying the selected factor (equal in one embodiment to 0.6745) by SIGMA (S=0.6745 SIGMA in the embodiment with a selected factor equal to 0.6745).

In some embodiments, S may be dynamically adjustable as previously described.

Figure 15:
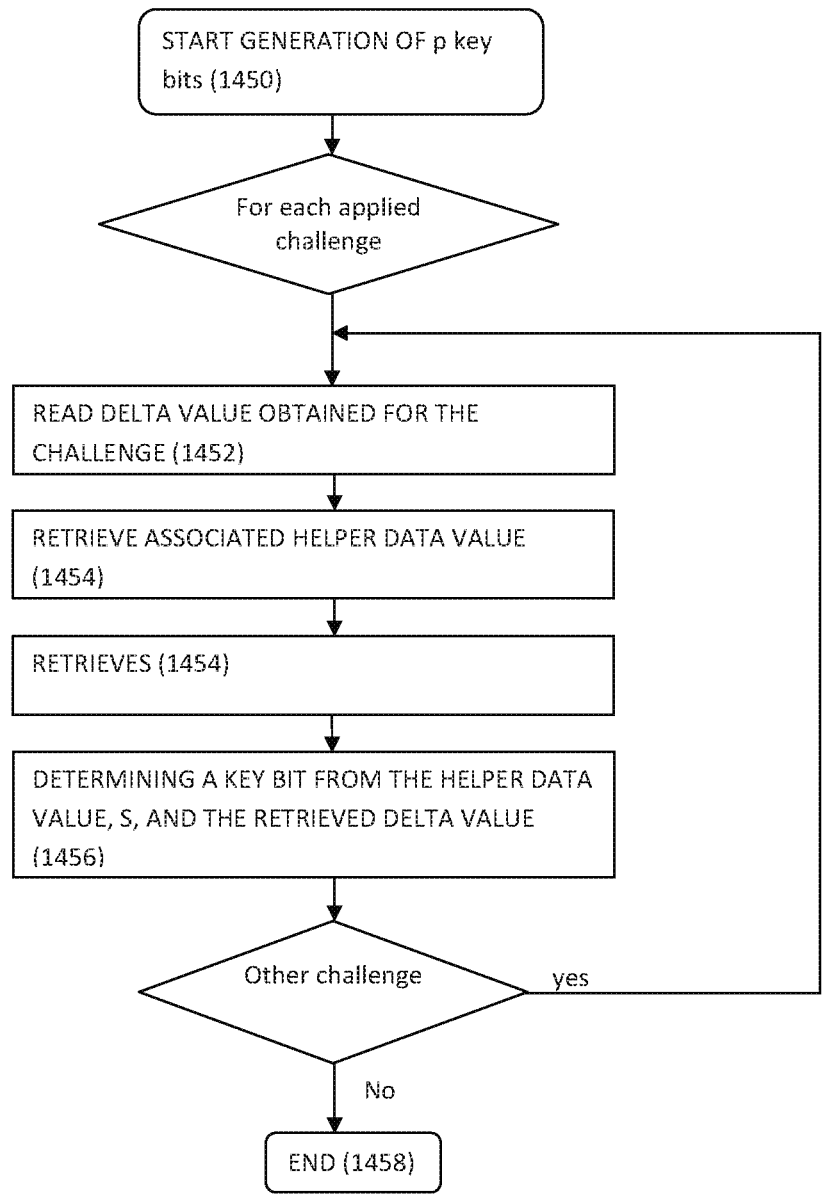
FIG. 15 depicts the key generation method implemented during a usage phase, according to the embodiment of FIG. 14.

FIG. 15 depicts the key generation method implemented during a usage phase from the helper data according to the embodiment considered in FIG. 14.

For each current challenge, the DELTA value corresponding to the challenge is read is step 1400.

At step 1402, the helper data bit corresponding to this current challenge is read.

At step 1404, a key bit is determined from the helper data bit and the DELTA value, the key bit thus obtained corresponding to the i-th key bit of the cryptographic key similarly to step of FIG. 1308 of FIG. 13.

Steps 1400 to 1404 are iterated for each of the p applied challenges, which provides the p key bits of the cryptographic key.

Figure 16:
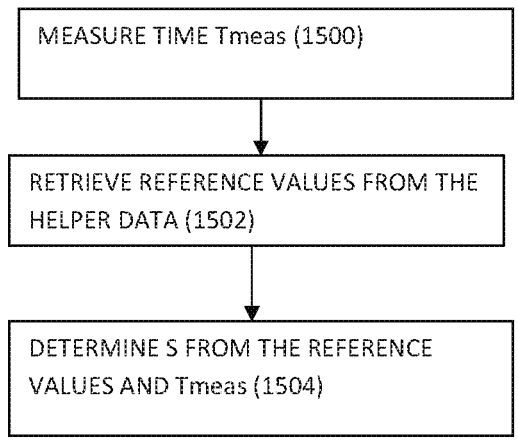
FIG. 16 is a flowchart illustrating the step of determining the reliability threshold, according to the embodiment of FIG. 14.

FIG. 16 is a flowchart illustrating the step of determining the reliability threshold (step 1308 of FIG. 14).

At step 1500, the time value $T_{meas}$ is measured for the reference challenge.

At step 1502, the reference threshold $S_{ref}$ and the reference time $T_{ref}$ are retrieved from the helper data.

At step 1504, the reliability threshold S is computed as: $S=S_{ref} \times T_{meas}/T_{ref}$.

Figure 17:
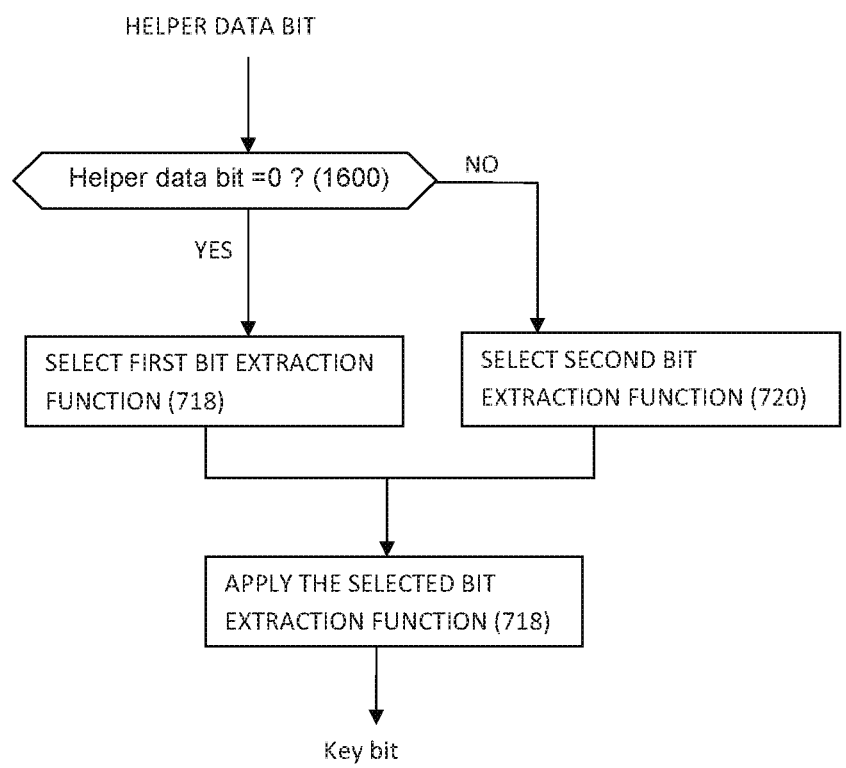
FIG. 17 is a flowchart depicting the key bit determination step, according to certain embodiments.

FIG. 17 is a flowchart depicting the key bit determination step of FIGS. 13 and 14 (steps 1208 and 1404), according to certain embodiments.

At step 1600, the helper data bit corresponding to the current challenge is retrieved.

At step 1602, it is determined if the value of the helper data bit is equal to '0'. If so, the first bit extraction method M1 is selected at step 1602. Otherwise, if the helper data bit is equal to '1', the second bit extraction method is selected at step 1604. At step 1606, the selected bit extraction function is applied, which provides the key bit value corresponding to the current challenge.

Figure 18:
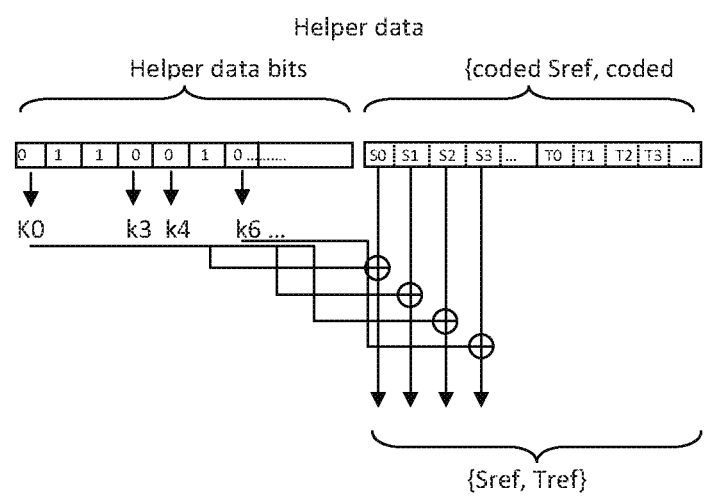
FIG. 18 shows an example of a key generation.

FIG. 18 shows an example of a key generation.

The helper data generated using the DELTA values obtained for the applied challenge is:

| h0 | h1 | h2 | h3 | h4 | h5 | h6 | ... |
|----|----|----|----|----|----|----|-----|
| 0  | 1  | 1  | 0  | 0  | 1  | 0  | ... |

In the above table, hi designates the i-th bit of the helper data.

The helper data embeds an encoded reference threshold comprising the bits Si and an encoded reference time comprising the bits Ti:

| S0 | S1 | S2 | S3 | ... | ... | T0 | T1 | T2 | T3 | ... |
|----|----|----|----|-----|-----|----|----|----|----|-----|

The key bits generated from the helper data bits are noted:

| K0 | K1 | K2 | K3 | K4 | K5 | K6 | ... |
|----|----|----|----|----|----|----|-----|

K0, K3, K4, K6 have been generated using the first bit extraction function M1 (correspond to a helper data bit equal to '0').

K1, K2, K5 have been generated using the second bit extraction function M2 (correspond to a helper data bit equal to '1').

In the example of FIG. 18, the bits of the reference threshold $S_{ref}$ may be decoded by XORING them with the one of the bits K0, K3, K4, K6 which have been generated using the first bit extraction function M1. Similarly, the bits of the reference time $T_{ref}$ may be decoded by XORING them with the one of the bits K0, K3, K4, K6 which has been generated using the first bit extraction function M1.

It should be noted that, although certain technical aspects of the invention have been described in combination, they can be used separately in certain applications.

In particular, it should be noted that although the above embodiments have been mainly described in relation with the selection of a bit extraction function out of two bit extraction functions, in certain embodiment, the helper data generator 2 may comprise only one bit extraction function, in particular the second bit extraction function M2, and apply such function M2 to generate the helper data. This allows generation of a helper data whose bits are indicative of the reliability of the key bits.

Figure 19:
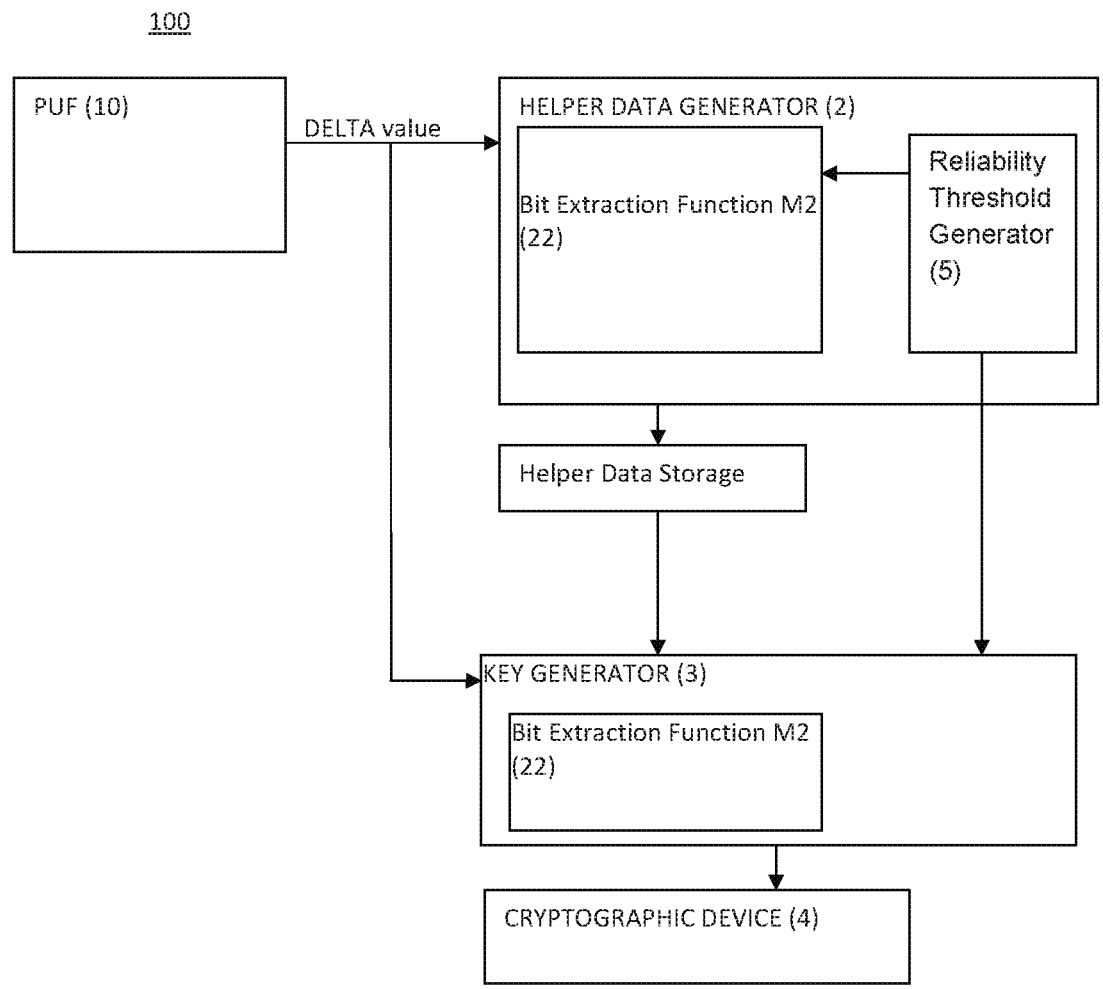
FIG. 19 shows an electronic system for generating secret information, according to another embodiment.

FIG. 19 shows an electronic system for generating secret key according to another embodiment. As shown, the helper data generator 2 only comprises the second bit extraction function M2 (22). In such embodiment, the reliability threshold S is set to the maximum noise level n (S=n). As described above, the second bit extraction function assigns a bit value equal to '0', if the value of DELTA is greater than the threshold S=n or inferior to −S=−n (i.e. absolute value of DELTA greater to the noise level S), and '1' otherwise. In such embodiment, the threshold S represents the threshold above which the associated key bit is considered reliable. In certain applications of the invention, the key information generator 3 may check the value of each bit of the helper data thus obtained to obtain information as regards the reliability of the associated key bit. More specifically, in such embodiment, a helper data bit equal to '0' points to a reliable key bit while a helper data bit equal to '1' points to an unreliable key bit. In certain applications, the key information generator 3 may thus select reliable key bits by checking the values of the helper data bits. In a possible application of the invention to secret key generation as depicted in FIG. 19, each key bit may be generated by applying the second extraction function 22.

Embodiments of the invention also ensure that environmental changes (temperature, Voltage) do not impact the reliability.

All the key bits obtained with the helper data generated from the delta value are accordingly reliable.

As Error Correcting Codes (ECC) are not required, the helper data extractions method and device according to the embodiments of the invention are robust against attacks on Error Correcting Codes.

Even if not limited to such application, some embodiments of the present invention are particularly suited for high volume markets, such as Internet Of Things (IoT).

The helper data extraction system and method described herein may be implemented by various means including hardware, software, or a combination thereof.

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. In particular, the invention is not limited to a particular type of delay-based PUF. The invention is not limited either to particular applications of the helper data.

The invention claimed is:

1. An electronic system for generating secret information comprising a Physically Unclonable Function (PUF) circuit, the PUF being configured to provide a difference between two values of a physical variable of the PUF in response to a challenge applied to the PUF, said physical variable representing a physical quantity, wherein the system is configured to apply a set of challenges during an enrolment phase, and measure the physical variable difference provided by the PUF, in response to each challenge, the system comprising:

A helper data generator configured to generate a helper data comprising a set of bits, a bit of the helper data being generated for each applied challenge, said helper data generator being configured to generate each helper data bit from the physical variable difference provided by the PUF in response to the applied challenge, the system further comprising a secret information generator for extracting secret information from said helper data, wherein the bits of the helper data are indicative of reliable key bits, the secret information generator being configured to select reliable key bits by checking the values of the helper data bits, and wherein the helper data generator is configured to apply at least two bit extraction functions to generate each helper data bit, during the usage phase, said at least two bit extraction functions comprising a first bit extraction function and a second bit extraction function, each bit extraction function being configured to return a bit value depending on a condition related to the physical variable difference with respect to said at least one reliability threshold, the condition of the first bit extraction function being different from the condition of the second bit extraction function.

2. The system of claim 1, wherein said at least one reliability threshold comprises a unique threshold, said unique threshold being determined from the probability distribution of the physical variable difference measured for a number of challenges applied during the enrolment phase.

3. The system of claim 2, wherein said unique threshold is determined during the enrolment phase from a condition related to the probability that the physical variable difference takes a value strictly inferior to minus said reliability threshold or strictly superior to said reliability threshold, said condition being satisfied if said probability is equal to a predefined probability value, said predefined probability value being strictly inferior to one.

4. The system of claim 3, wherein said predefined probability value is equal to ½.

5. The system of claim 2, wherein said at least two bit extraction function comprises one bit extraction function configured to:

return a bit value equal to one if the physical variable difference is strictly superior to minus the reliability threshold, or strictly inferior to the unique threshold;

return a bit equal to zero if the physical variable difference is strictly inferior to minus the reliability threshold or strictly superior to the unique threshold.

6. The system of claim 1, wherein said at least one reliability threshold comprises a first and a second reliability thresholds, the first reliability threshold being strictly higher than the second reliability threshold, the reliability thresholds being strictly positive, and wherein at least two bit extraction functions comprise one bit extraction function that depends on the value of the physical variable difference with respect to said first and second reliability thresholds.

7. The system of claim 6, wherein the first reliability threshold is strictly higher than the sum of the second reliability threshold and of the double of a maximum noise level.

8. The system of claim 7, wherein the threshold generator is configured to determine the first reliability threshold during the enrolment phase such that the probability that the physical variable difference takes a value strictly inferior to minus the first reliability threshold or strictly superior to the first reliability threshold is equal to a first probability value, and wherein the threshold generator is configured to determine the second reliability threshold during the enrolment phase such that the probability that the physical variable difference takes a value strictly inferior to minus the second reliability threshold or strictly superior to the second reliability threshold is equal to a second probability value, said first and second probability value being positive and strictly inferior to one.

9. The system of claim 8, wherein each reliability threshold is further determined, during the enrolment phase, such that the probability that the physical variable difference takes a value strictly inferior to minus the first reliability threshold or strictly superior to the second reliability threshold is equal to an auxiliary probability value.

10. The system of claim 9, wherein said auxiliary probability value is a function of the sum of the first probability value and of the second probability value, the first probability value being higher than the second probability value.

11. The system of claim 10, wherein the sum of the first probability value and of the second probability value is equal to one.

12. The system of claim 1, wherein the secret information generator is configured to select one of said at least two bit extraction functions depending on the value of the helper data bit, and to apply the selected bit extraction function to generate said key bit.

13. A method of generating secret information using a Physically Unclonable Function (PUF) circuit, the method comprising providing a physical variable difference between two paths of the PUF in response to a challenge applied to the PUF, said physical variable representing a physical quantity, wherein the method comprises applying a set of challenges during an enrolment phase, and measuring the physical variable difference provided by the PUF in response to each challenge, the method further comprising:
generating a helper data comprising a set of bits, a bit of the helper data being generated for each applied challenge, said step of generating a helper data comprising generating each helper data bit from the physical variable difference measured by the PUF in response to the applied challenge,
the method further comprising extracting secret information from said helper data, wherein the bits of the helper data are indicative of reliable key bits, the step of extracting secret information comprising selecting reliable key bits by checking the values of the helper data bits,
wherein said step of generating a helper comprising applying at least two bit extraction functions to generate each helper data bit, during the usage phase, said at least two bit extraction functions comprising a first bit extraction function and a second bit extraction function, each bit extraction function being configured to return a bit value depending on a condition related to the physical variable difference with respect to said at least one reliability threshold, the condition of the first bit extraction function being different from the condition of the second bit extraction function.

* * * * *